United States Patent [19]

Egawa

[11] Patent Number: 5,850,282
[45] Date of Patent: Dec. 15, 1998

[54] DISTANCE MEASURING DEVICE

[75] Inventor: Akira Egawa, Kawasaki, Japan

[73] Assignee: Canon Kabushiki Kaisha, Tokyo, Japan

[21] Appl. No.: 727,376

[22] Filed: Oct. 8, 1996

[30] Foreign Application Priority Data

Oct. 11, 1995 [JP] Japan .................................... 7-263182
Oct. 11, 1995 [JP] Japan .................................... 7-263183

[51] Int. Cl.⁶ .............................. G01C 3/00; G03B 13/00; G02B 7/04
[52] U.S. Cl. .................. 356/3.08; 250/201.4; 250/201.6; 356/3.04; 396/106
[58] Field of Search .................. 356/3.08, 3.03, 356/3.04; 396/106; 250/201.4, 201.6, 201.8

[56] References Cited

U.S. PATENT DOCUMENTS

| | | |
|---|---|---|
| 4,522,492 | 6/1985 | Masunaga . |
| 4,748,469 | 5/1988 | Tamura . |
| 4,899,041 | 2/1990 | Fetzer et al. ........................... 356/3.08 |
| 4,943,157 | 7/1990 | Reding . |
| 4,958,180 | 9/1990 | Matsui et al. . |
| 5,293,194 | 3/1994 | Akashi . |
| 5,362,970 | 11/1994 | Pryor et al. . |
| 5,369,462 | 11/1994 | Miyazawa et al. ..................... 356/3.08 |
| 5,512,997 | 4/1996 | Ogawa ................................. 356/3.08 |
| 5,613,167 | 3/1997 | Suzuki ................................. 356/3.08 |

FOREIGN PATENT DOCUMENTS

| | | |
|---|---|---|
| 0 730 167 A2 | 9/1996 | European Pat. Off. . |
| 7-146138 | 6/1995 | Japan . |
| 7-146139 | 6/1995 | Japan . |

*Primary Examiner*—Stephen C. Buczinski
*Attorney, Agent, or Firm*—Morgan & Finnegan, LLP

[57] ABSTRACT

Light projected by a light projecting portion and reflected by an object is received by two sensor arrays (105, 106). Difference signals between signals respectively added by ring CCDs (113b, 114b) in correspondence with the ON and OFF states of the light projecting portion are calculated, and the distance to the object to be measured is calculated on the basis of the relative values of the positions of the difference signals on the sensor arrays (105, 106). The two sensor arrays (105, 106) form the base length, and the light projecting portion (104) is disposed at a position offset from the base length.

26 Claims, 23 Drawing Sheets

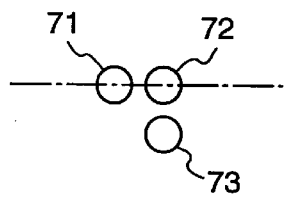
FIG. 6
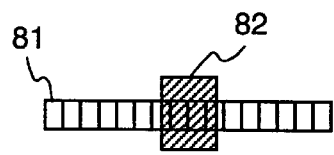
FIG. 7
FIG. 8
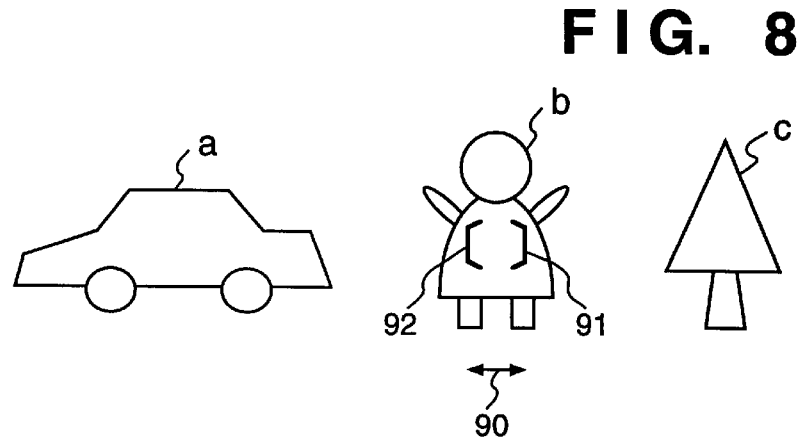
FIG. 9
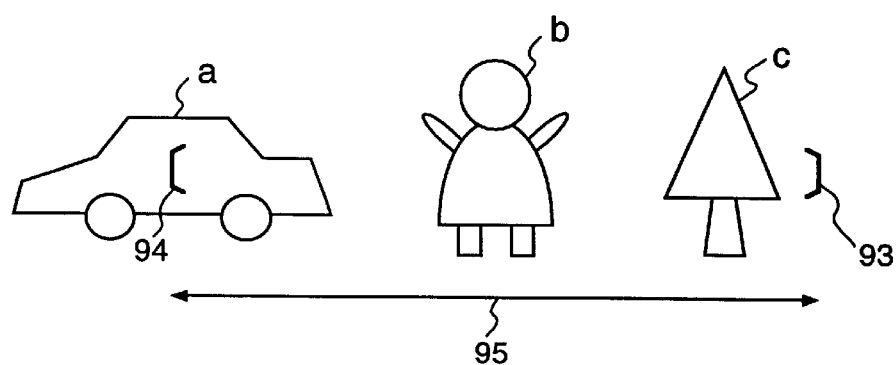

F I G. 15A 
F I G. 15B 
F I G. 15C 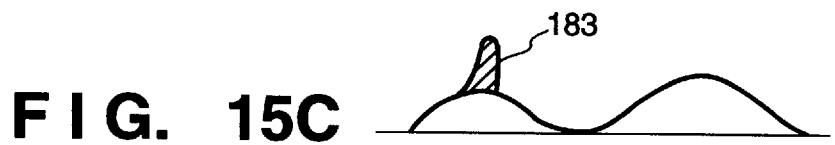
F I G. 15D 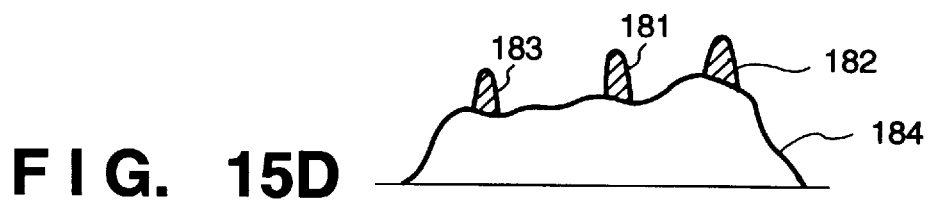
F I G. 15E 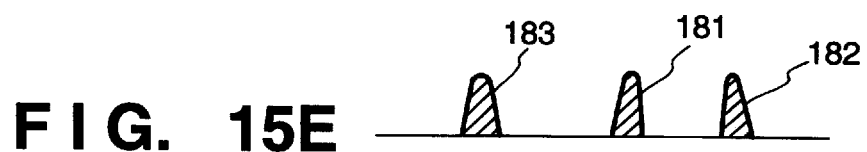

F I G. 20
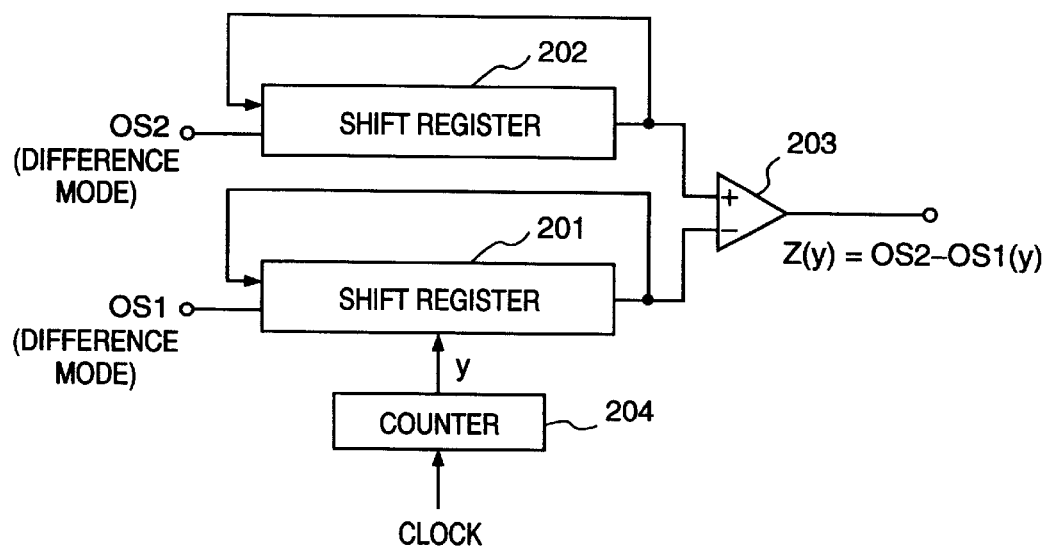
F I G. 21
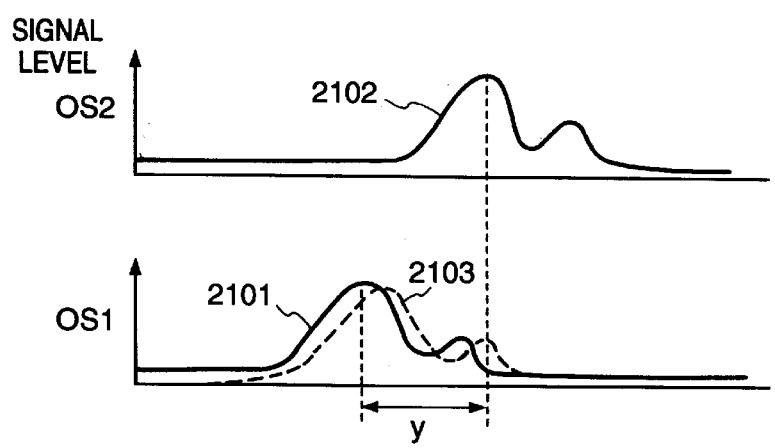

DISTANCE MEASURING DEVICE

BACKGROUND OF THE INVENTION

The present invention relates to a distance measuring device for measuring the distance to an object to be measured and, for example, to a device suitably applied to the AF mechanism of a camera.

Conventionally, a distance measuring device which performs a trigonometrical measurement by projecting a light spot onto an object to be measured, the distance to which is to be measured, and receiving light reflected by the object using a position detection means such as a PSD (position sensitive detector) or the like, is known. On the other hand, another distance measuring device which circulates an accumulated charge using a ring-shaped CCD-to integrate reflected light of ON/OFF-projected light spots, and skims a predetermined amount of charges of external light components other than the light spot has been proposed by Japanese Patent Publication No. 5-22843.

As a distance measuring device using a PSD, a device shown in FIG. 23 is known well. More specifically, a light spot is projected from an infrared light-emitting diode (IRED) 204 serving as a light spot projecting means onto an object to be measured (not shown) via a projection lens 202, and light reflected by the object is received by a position detection element (PSD) 203 via a light-receiving lens 201. The distance between the optical axes of the projection lens 202 and the light-receiving lens equals the base length. If the base length and the distance from the light-receiving lens 201 to the sensor surface of the PSD 203 are constant, the position of the projected light spot image on the sensor surface of the PSD 203 changes in correspondence with the distance to the object to be measured. For example, when the object is vary far, incident light is incident in a direction substantially parallel to the optical axis of the light-receiving lens 201, and an image is formed near a terminal B. On the other hand, as the object draws nearer, since incident light is incident from the obliquely right direction, the image approaches the terminal A side. The two terminals A and B of the PSD 203 output current signals corresponding to the light-receiving position, and the distance to the object to be measured can be detected based on the current ratio.

However, as shown in FIG. 24, when only half of a finite light spot 212 having a predetermined size is projected onto an object 211 to be measured, the broken line portion of a received light image 213 on the PSD 203 is omitted. Since the PSD 203 detects the barycentric position of the received light image as the position of an image, it detects a barycentric position G2 in place of an original barycentric position G1. For this reason, errors are generated in the distance to the object to be measured. This problem cannot be solved even when a sensor array is used in place of the PSD 203.

In order to correct errors caused by movement of the barycentric position of the received light image, as shown in FIGS. 25A and 25B (in these figures, the object to be measured is present in a direction perpendicular to the plane of the drawing), an arrangement in which second light-receiving portions 223 and 224 for correction are added as a light-receiving lens and a PSD in addition to a light projecting portion 221 and a light-receiving portion 222, has been proposed. Note that an alternate long and short dashed line 220 in FIGS. 25A and 25B indicates a base. FIG. 26A shows a PSD 225 of the light-receiving portion 222, and FIG. 26B shows a PSD 226 of the light-receiving portions 223 and 224.

In the distance measuring device shown in FIG. 25A, the light-receiving portion 223 for correction is disposed at a position offset from the light projecting portion 221 in a direction perpendicular to the base direction, as shown in FIG. 26B. For this reason, the PSD 226 can have a short length. However, since the optical axis of the light projecting portion 221 does not agree with that of the light-receiving portion 223, they have a base length in the vertical direction, and the received light image on the PSD 226 moves in the vertical direction in correspondence with the distance to the object to be measured. To cope with such movement, the width of the PSD 226 must be increased vertically.

On the other hand, in the distance measuring device shown in FIG. 25B, errors are corrected by inserting the light projecting portion 221 between the two light-receiving portions 222 and 224, and as a result, a size reduction of the device is limited. Therefore, a size reduction of the device cannot be attained even when the S/N ratio of the light-receiving portion is improved or a device having a high position detection resolution is used.

In still another distance measuring device, a distance measurement is performed on the basis of the correlation between image signals, generated based on the pattern of an object to be measured, on two sensor arrays separated by a distance equal to the base length without projecting any light spot onto an object at a far distance or an object having a low reflectance. However, in this case, if the object to be measured has no pattern, image signals cannot be obtained, thus disturbing the distance measurement. Furthermore, since no light spot is projected, no image signals are obtained in a dark place. On the other hand, when image signals suffer perspective conflict, an accurate distance measurement cannot be attained. When a distance measurement is performed over a broad range to cope with perspective conflict, the length of each sensor array must be increased, and it becomes impossible to attain the distance measurement.

SUMMARY OF THE INVENTION

It is an object of the present invention to provide a compact distance measuring device which can accurately perform a distance measurement suffering less errors even when a portion of a projected light image is omitted.

It is another object of the present invention to provide a distance measuring device which can accurately measure the distance to an object at a far distance or an object having a low reflectance.

According to the present invention, the foregoing object is attained by providing a distance measuring device comprising: light projecting means for projecting light onto an object to be measured; first and second sensor arrays, each comprising an array of a plurality of sensors, the first and second sensor arrays receiving light beams reflected by the object to be measured via first and second optical paths, and photoelectrically converting the light beams; charge transfer means, having at least a portion coupled in a ring shape, for transferring signal charges from the sensors of the first and second sensor arrays; and control means for calculating difference signals of signals from the first and second sensor arrays in correspondence with ON and OFF periods of the light projecting means, and calculating a distance to the object to be measured on the basis of relative values of positions of the difference signals on the first and second sensor arrays.

Further, according to the present invention, there is provided a distance measuring device comprising: light projecting means for projecting a light spot onto an object to be measured, a distance to which is to be measured; first and second sensor arrays, each comprising an array of a plurality of sensors, the first and second sensor arrays receiving light reflected by the object to be measured and photoelectrically converting the received light; charge transfer means, having a ring portion, at least a portion of which is coupled in a ring shape, for sequentially accumulating charges; skim means for removing a predetermined amount of charges from the charges transferred by the charge transfer means; and control means for selectively performing first processing in which signal charges from the sensors of the first and second sensor arrays in ON and OFF states of the light projecting means are circulated through the ring portion while operating the skim means, difference signals of signals from the first and second sensor arrays in correspondence with the ON and OFF states of the projected light spot are calculated, and a distance to the object to be measured is obtained on the basis of relative values of positions of the difference signals on the first and second sensor arrays, and second processing in which signal charges from the sensors of the first and second sensor arrays in an OFF state of the light projecting means are circulated through the ring portion without operating the skim means, and a distance to the object to be measured is obtained on the basis of relative values of positions of signals from the first and second sensor arrays on the first and second sensor arrays.

Further, according to the present invention, there is provided a distance measuring device comprising: light projecting means for projecting a light spot onto an object to be measured, a distance to which is to be measured; first and second sensor arrays, each comprising an array of a plurality of sensors, the first and second sensor arrays receiving light reflected by the object to be measured and photoelectrically converting the received light, charge transfer means, having a ring portion, at least a portion of which is coupled in a ring shape, for sequentially accumulating charges, skim means for removing a predetermined amount of charges from the charges transferred by the charge transfer means; and control means for selectively performing first processing in which signal charges from the sensors of the first and second sensor arrays in ON and OFF states of the light projecting means are circulated through the ring portion while operating the skim means, difference signals of signals from the first and second sensor arrays in correspondence with the ON and OFF states of the projected light spot are calculated, and a distance to the object to be measured is obtained on the basis of relative values of positions of the difference signals on the first and second sensor arrays, and second processing in which when a contrast of signals from the first and second sensor arrays in an OFF state of the light projecting means is lower than a predetermined value; the ring portion performs charge accumulation by circulating signal charges from the sensors of the first and second sensor arrays through the ring portion while operating the skim means until the contrast becomes higher than the predetermined value, and a distance to the object to be measured is obtained on the basis of relative values of positions of signals from the first and second sensor arrays on the first and second sensor arrays.

Further, according to the present invention, there is provided a distance measuring device comprising: first and second sensor arrays, each comprising an array of a plurality of sensors, the first and second sensor arrays receiving light reflected by an object to be measured and photoelectrically converting the received light; charge transfer means, having a ring portion, at least a portion of which is coupled in a ring shape, for sequentially accumulating charges; skim means for removing a predetermined amount of charges from the charges transferred by the charge transfer means; and control means for, when a contrast of signals from the first and second sensor arrays is lower than a predetermined value, performing charge accumulation using the ring portion by circulating signal charges from the sensors of the first and second sensor arrays through the ring portion while operating the skim means until the contrast becomes higher than the predetermined value, and obtaining a distance to the object to be measured on the basis of relative values of positions of signals from the first and second sensor arrays on the first and second sensor arrays.

Further, according to the present invention, there is provided a distance measuring device for measuring a distance to an object, comprising: light projecting means for projecting light onto an object; light-receiving means for receiving light including light reflected by the object at two light-receiving portions at different positions, and converting the light received by the light-receiving portions into image signals; and distance measuring means for turning on/off the light projecting means, acquiring difference signals, corresponding to the two light-receiving portions, between an image signal corresponding to light received by the light-receiving means when the light projecting means projects light, and an image signal corresponding to light received by the light-receiving means when the light projecting means does not project light, and obtaining a distance to the object on the basis of an offset amount between the difference signals of the two light-receiving portions.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6 is a view showing the layout of the distance measuring device according to the first embodiment;

FIG. 7 is a view showing the positional relationship between the sensor array and the image signal in FIG. 6;

FIG. 8 is a view for explaining a narrow distance measuring range;

FIG. 9 is a view for explaining a broad distance measuring range;

FIGS. 15A to 15E are views for explaining the operation of the device shown in FIG. 14;

FIG. 20 is a block diagram showing the arrangement of a correlation calculation unit;

FIG. 21 is a graph showing an example of the correlation calculation procedure;

DETAILED DESCRIPTION OF THE PREFERRED EMBODIMENTS

The preferred embodiments of the present invention will be described hereinafter with reference to the accompanying drawings.

[First Embodiment]

Figure 1:
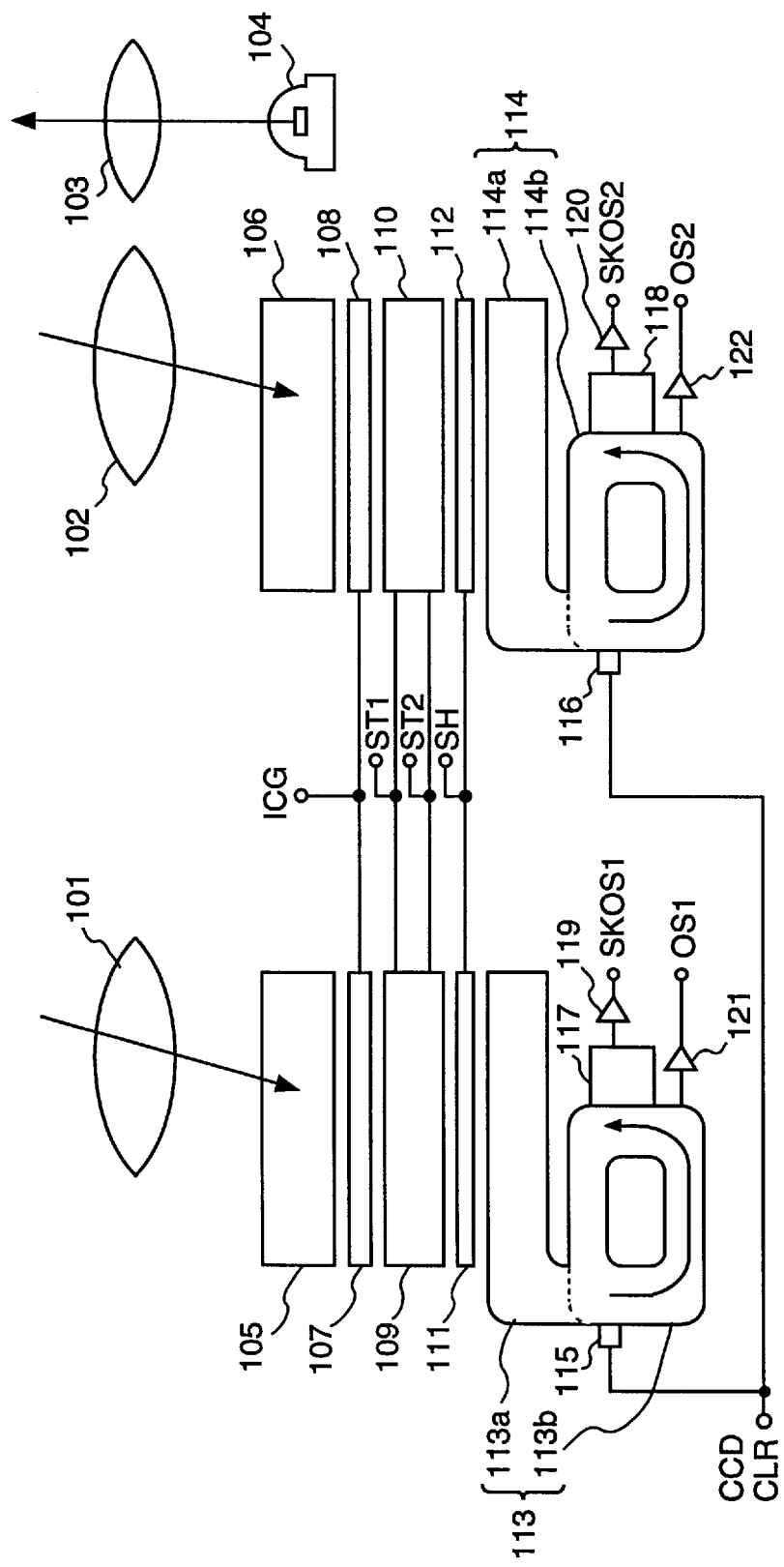
FIG. 1 is a schematic view showing a distance measuring device according to an embodiment of the present invention.

FIG. 1 is a schematic view mainly showing a sensor unit of a distance measuring device according to an embodiment of the present invention. Note that the arrangement of the overall device will be described later with reference to FIG. 19.

<Arrangement of Light-receiving Unit>

Referring to FIG. 1, first and second light-receiving lenses 101 and 102 respectively form first and second optical paths. A projection lens 103 focuses light emitted by a light-emitting element 104, which projects a light spot, onto an object to be measured (not shown). First and second sensor arrays 105 and 106 comprise sensor blocks (see FIG. 2) each consisting of a plurality of photoelectric conversion elements. First and second clear portions 107 and 108 have an electronic shutter function of clearing charges photoelectrically converted by the sensor blocks of the first and second sensor arrays 105 and 106 at the timings of pulses ICG.

Each of first and second charge accumulation units 109 and 110 has ON and OFF accumulation portions, as will be described later, which respectively accumulate charges corresponding to ON and OFF periods of the light-emitting element 104 and supplied from the first and second sensor arrays 105 and 106 at the timings of pulses $ST_1$ and $ST_2$ in units of pixels. First and second transfer gates 111 and 112 parallelly transfer charges accumulated in the first and second charge accumulation units 109 and 110 to linear CCDs 113a and 114a at the timings of pulses SH, respectively.

First and second charge transfer units 113 and 114 are respectively constituted by the linear CCDs 113a and 114a having portions opposing the first and second charge transfer gates 111 and 112, and ring CCDs 113b and 114b (ring-shaped charge transfer portions), which are formed in an annular shape to be contiguous with the linear CCDs 113a and 114a. In these ring CCDs 113b and 114b, charges corresponding to the ON and OFF periods of the light-emitting element 104 are sequentially added when charges circulate.

First and second initialization circuits 115 and 116 initialize the ring CCDs 113b and 114b by clearing all the charges therein in response to pulses CCDCLR. First and second skim circuits 117 and 118 skim a predetermined amount of charges from the ring CCDs 113b and 114b. SKOS signal output circuits 119 and 120 read out charges in the ring CCDs 113b and 114b in a non-destructive manner, and respectively output signals $SKOS_1$ and $SKOS_2$ used for discriminating whether or not a charge skimming operation is to be performed in the first and second skim circuits 117 and 118. OS signal output circuits 121 and 122 sequentially read out charges in the ring CCDs 113b and 114b and respectively output signals $OS_1$ and $OS_2$.

The detailed arrangement of the first and second sensor arrays 105 and 106, and the first and second charge transfer units 113 and 114 illustrated in FIG. 1 will be described below with reference to FIG. 2.

A sensor array 11 (corresponding to the first and second sensor arrays 105 and 106 in FIG. 1) consists of five sensor blocks $S_1$ to $S_5$, and signal charges photoelectrically converted by the sensor blocks $S_1$ to $S_5$ are integrated by integral portions 12. Note that the number of pixels in the sensor array 11 is not limited to five in this embodiment, but the sensor array 11 may have N pixels (N: natural number). The integral portions 12 have clear portions 13 driven by the pulses ICG.

Figure 2:
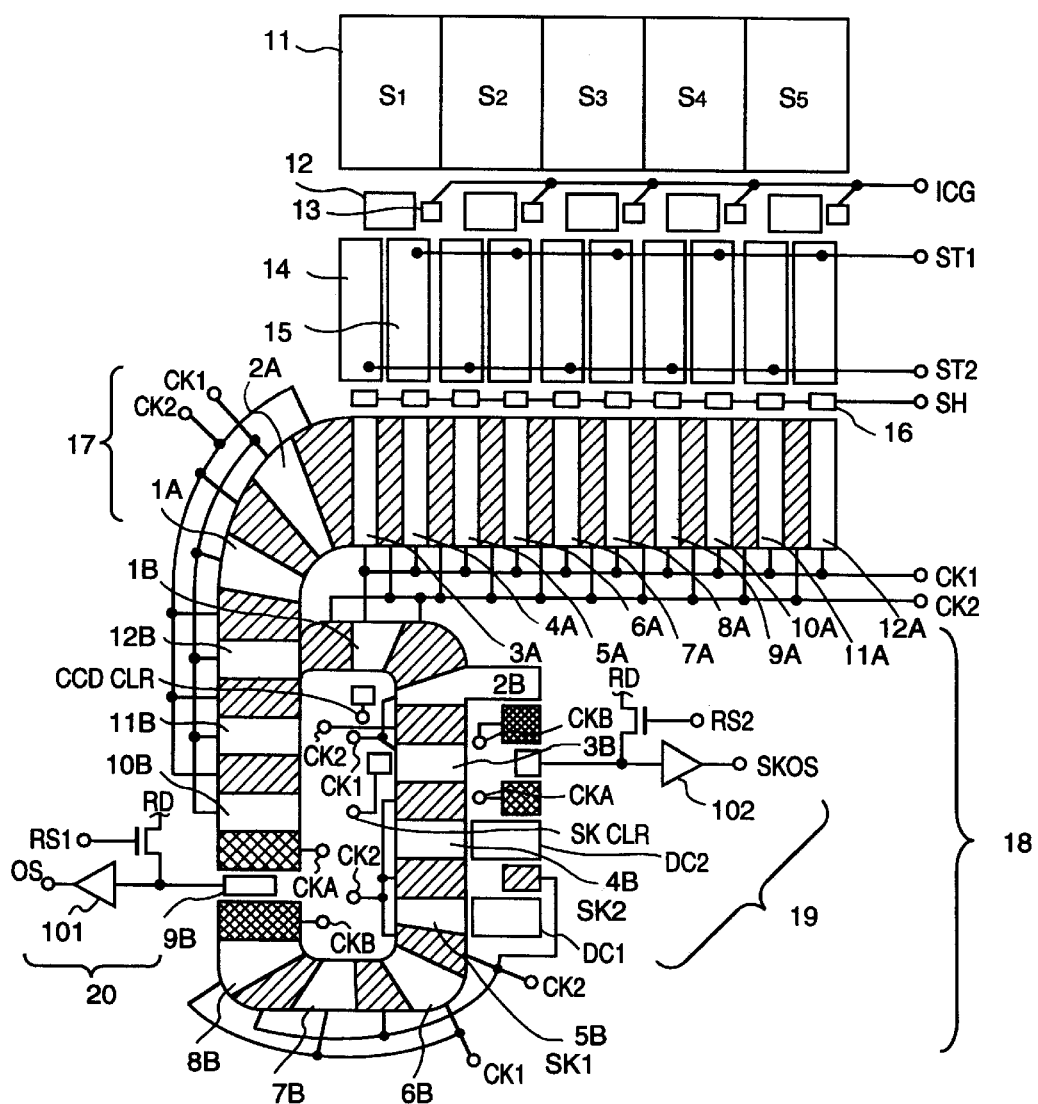
FIG. 2 is a view showing principal part of the distance measuring device shown in FIG. 1.

In this embodiment, as shown in FIG. 2, first and second accumulation portions 15 and 14 (corresponding to the first and second charge accumulation units 109 and 110) are alternately arranged in a direction parallel to the sensor array 11, and each integral portion 12 corresponds to a pair of accumulation units 14 and 15. Charges integrated by each integral portion 12 are alternately transferred to a corresponding pair of accumulation units 14 and 15 in response to the pulses $ST_1$ and $ST_2$.

The output terminals of the pair of accumulation portions 14 and 15 are connected to a linear CCD 17 (corresponding to the linear CCDs 113a and 114a) of a charge transfer portion via corresponding shift portions 16 (corresponding to the first and second charge transfer gates 111 and 112) driven by the pulses SH. The linear CCD 17 is coupled to a ring CCD 18 (corresponding to the ring CCDs 113b and 114b) of the charge transfer portion. Each stage of the linear CCD 17 and the ring CCD 18 is constituted by a two-phase CCD cell driven by two-phase clocks $CK_1$ and $CK_2$. Note that each stage may comprise a three-phase CCD cell, four-phase CCD cell, or the like. The ring CCD 17 is constituted by 12 stages, i.e., CCD cells $1_A$ to $12_A$, and the ring CCD 18 is also constituted by 12 stages, i.e., CCD cells $1_B$ to $12_B$. When the sensor array 11 has N pixels, each of the linear CCD 17 and the ring CCD 18 has (2N+2) stages.

The charge transfer operation from the sensor array 11 to the linear CCD 17 will be described below with reference to FIGS. 3 and 4.

Signal charges photoelectrically converted by the sensor blocks $S_1$ to $S_5$ in the sensor array 11 are transferred to and integrated by the integral portions 12. Prior to these integral operations, as shown in FIG. 4, charges in the integral portions 12 are cleared by pulses ICG transmitted at predetermined periods, thus initializing the integral portions 12 (a bold arrow in FIG. 3).

Figure 3:
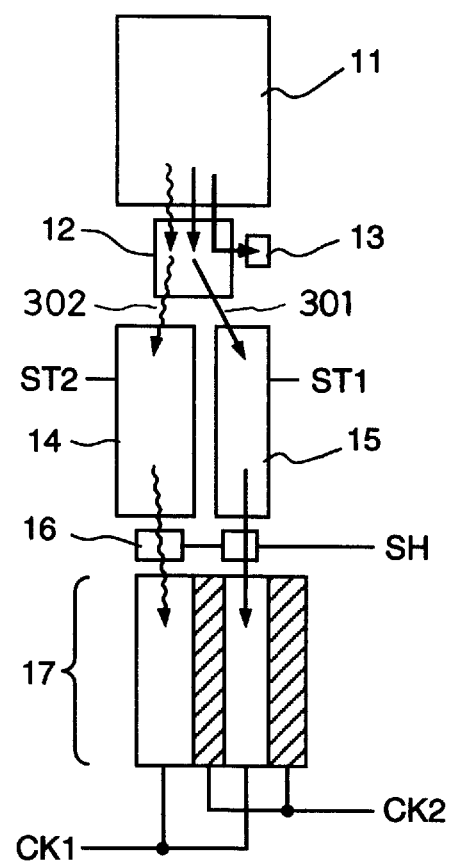
FIG. 3 is a schematic view showing the operations of an integral portion and an accumulation portion in the device shown in FIG. 2.

After charges are transferred from the sensor blocks $S_1$ to $S_5$ in the sensor array 11 and are integrated by the integral portions 12 during a light-projection ON period of a light-emitting diode (IRED; not shown), they are transferred to the first accumulation portions 15 in response to a pulse $ST_1$ (a thin arrow 301 in FIG. 3). Subsequently, the IRED is turned off. After charges are transferred from the sensor blocks $S_1$ to $S_5$ in the sensor array 11 and are integrated by the integral portions 12 during a light-projection OFF period of the IRED, they are transferred to the second accumulation portions 14 in response to a pulse $ST_2$ (a wavy arrow 302 in FIG. 3). Therefore, a total of periods $t_1$ and $t_2$ from the clearing operation of the integral portions 12 in response to the pulses ICG until charge transfer in response to the pulses $ST_1$ and $ST_2$ corresponds to the integral time. More specifically, the clear portions 13 provided to the integral portions 12 also have an electronic shutter function of controlling the integral time in the integral portions 12 in accordance with the generation timings of the pulses ICG. For example, the timing of the pulse ICG is advanced or delayed in correspondence with the luminance of an object to be measured, and as the luminance becomes higher, the timing of the pulse ICG is set closer to the timing of the pulse $ST_1$ or $ST_2$ so as to shorten the integral time.

In this manner, each first accumulation portion 15 accumulates charges corresponding to both infrared light reflected by an object and external light, and each second accumulation portion 14 accumulates charges corresponding to only external light.

The charges which correspond to external light+infrared light reflected by an object during the light-projection ON period and are transferred to the first accumulation portions 15 in response to the pulses $ST_1$, and the charges which correspond to only external light during the light-projection OFF period and are transferred to the second accumulation portions 14 in response to the pulses $ST_2$, are respectively transferred to the CCD cells $3_A$ to $12_A$ of the linear CCD 17 in response to pulses SH. With this operation, for example, a charge generated by the sensor block $S_1$ during the light-projection OFF period is transferred to the CCD cell $3_A$, a charge generated by the sensor block $S_1$ during the light-projection ON period is transferred to the CCD cell $4_A$, a charge generated by the sensor block $S_2$ during the light-projection OFF period is transferred to the CCD cell $5_A$, . . . In this manner, charges in the light-projection OFF and ON periods are alternately transferred to the CCD cells $3_A$ to $12_A$ of the linear CCD 17. The charges transferred to the CCD cells $3_A$ to $12_A$ are transferred inside the linear CCD 17 in response to clocks $CK_1$ and $CK_2$.

At this time, in this embodiment, since the charges generated in the light-projection ON and OFF periods are transferred via different accumulation portions 14 and 15, any unbalance between the dark currents in the accumulation portions in the light-projection ON and OFF periods can be eliminated. Since the charges generated in the light-projection ON and OFF periods are delayed by a predetermined period of time in the accumulation portions 14 and 15, and are simultaneously transferred to the linear CCD 17, the clocks $CK_1$ and $CK_2$ that drive the linear CCD 17 need not have any stop period. Since the charges can be transferred to the linear CCD 17 in synchronism with one-shot clock $CK_1$, the degree of freedom upon designing the timings of the pulses $ST_1$ and $ST_2$ is high. When the pulses $ST_1$ and $ST_2$ are generated in correspondence with the ON/OFF state of an IRED signal, even when the light-projection ON and OFF periods replace each other, charge pairs generated in one sensor block can always be transferred in the order of OFF→ON.

In FIG. 2, the CCD cells $1_A$ and $2_A$ of the linear CCD 17 are added in terms of the coupling layout between the linear CCD 17 and the ring CCD 18, and may be used in offset adjustment as empty CCD cells. More specifically, charges go around the ring CCD 18 in the order of cell $12_B \rightarrow 11_B \rightarrow 10_B \rightarrow \ldots \rightarrow 2_B \rightarrow 1_B \rightarrow 12_B$. The pulses SH used for transferring charges from the second or first accumulation portions 14 or 15 to the linear CCD 17 are synchronized with the cycle of one round of the ring CCD 18. More specifically, as shown in FIG. 4, the pulse SH is generated every 12 clocks $CK_1$ (the same applies to $CK_2$) used for transferring charges inside the ring CCD 18. On the other hand, the light-projection ON and OFF periods and the pulses $ST_1$ and $ST_2$ synchronous with these periods are synchronized with the pulses SH. Hence, the signal charges generated by the sensor blocks $S_1$ to $S_5$ in the light-projection ON and OFF periods are added to charges that go around the ring CCD 18 every round. Since the number of stages of the linear CCD 17 is 12, the linear CCD 17 can be driven by the same clocks $CK_1$ and $CK_2$ as those for the ring CCD 18. More specifically, since the CCD cells $1_A$ and $2_A$ are added to 10 stages of CCD cells $3_A$ to $12_A$ for receiving charges from the pairs of accumulation portions 14 and 15 in the linear CCD 17 to obtain 12 stages, the CCD cells $1_A$ and $2_A$ serve as offset adjustment CCD cells between the linear CCD 17 and the ring CCD 18.

Of the ring CCD 18, the gate of the CCD cell $9_B$ is a floating gate, and is connected to an output portion 20. The output portion 20 converts a charge amount in the CCD cell $9_B$ into a voltage, and outputs the voltage as a signal OS via an amplifier 101. RD is the reset potential, the charge amount in the CCD cell $9_B$ is directly transferred to the CCD cell $8_B$ without being destructed, and the floating gate of the CCD cell $9_B$ is reset via a MOS gate driven by a pulse $RS_1$.

A CCDCLR terminal provided to the CCD cell $1_B$ of the ring CCD 18 is used for clearing a charge in the CCD cell $1_B$ by the pulse CCDCLR. Upon initializing a device, this portion clears the charges in the linear CCD 17 and the ring CCD 18 (see FIG. 5). Upon initialization, when a pulse CCDCLR is input to the CCD in synchronism with clocks $CK_1$ and $CK_2$, charges that go around the ring CCD are cleared. Upon integrating charges, the pulse CCDCLR is kept at LOW level.

The arrangement of a skim portion 19 arranged in the ring CCD 18 will be described below. The CCD cells $5_B$ and $4_B$ of the ring CCD 18 are respectively constituted as skim elements $SK_1$ and $SK_2$. More specifically, the first skim element $SK_1$ is formed with a potential well for storing only a predetermined amount of charges. When the amount of charges transferred from the previous CCD cell $6_B$ exceeds the capacity of the well, overflowing charges flow into an element $DC_1$. After charges from the CCD cell $6_B$ are distributed to the first skim element $SK_1$ and the element $DC_1$, these charges are respectively transferred to the second skim element $SK_2$ and an element $DC_2$ in response to a pulse $CK_2$. The second skim element $SK_2$ is formed with a potential well having a capacity smaller than that of the first skim element $SK_1$, and charges overflowing from this well flow into the element $DC_2$ and are added to those transferred from the element $DC_1$.

An amplifier 102 arranged in this skim portion 19 has the same arrangement as that of the amplifier 101 in the above-mentioned output portion 20. That is, the amplifier 102 converts the charge amount transferred from the element $DC_2$ to the output-stage CCD cell of the skim portion 19 into a voltage, and outputs the voltage as a signal SKOS. The floating gate of the output-stage CCD cell of the skim portion 19 is reset to the level RD by a reset signal $RS_2$. By checking the output SKOS from the amplifier 102, whether or not charges overflow in the skim elements $SK_1$ and $SK_2$ can be determined. When charges overflow, the charges transferred from the second skim element $SK_2$ to the next CCD cell $3_B$ are cleared by a pulse SKCLR. Furthermore, the overflowing charges in the element $DC_2$ are transferred to the CCD cell $2_B$, and go around the ring CCD 18. On the other hand, when charges do not overflow in the skim elements $SK_1$ and $SK_2$, no pulse SKCLR is formed, and charges in the second skim element $SK_2$ go around the ring CCD 18.

<Description of Skim Operation>

The skim operation will be described in detail below.

Charges corresponding to the light-projection ON and OFF periods alternately go around the ring CCD 18, so that charges corresponding to the OFF period go ahead of those corresponding to the ON period in units of cells. First, the output SKOS is checked in an OFF portion to determine if a pulse SKCLR is to be output. If the output SKOS is detected in the OFF portion, a pulse SKCLR is generated to clear charges transferred from the second skim element $SK_2$ to the CCD cell $3_B$. On the other hand, charges corresponding to the light-projection ON period are subjected to the same clear processing by generating a pulse SKCLR only when it is determined in the previous OFF portion that charges are to be cleared. With this operation, the same amount of charges are decreased from a pair of charges sensed by the identical sensor and corresponding to the light-projection ON and OFF periods. More specifically, charges corresponding to external light components accumulated during the light-projection OFF period are excluded from a signal which is being transferred, and charges corresponding to reflected light of projected light overflow from the skim elements and are integrated while going around the ring CCD 18. Therefore, when the difference between the pair of charge outputs corresponding to the ON and OFF periods is calculated finally, signal light can be detected. Note that the CCD cells $5_B$ to $2_B$ serving as the first skim element constitute the skim portion 19.

The charge transfer operation by the ring CCD and the signal output control procedure will be described below with reference to FIG. 5.

Figure 5:
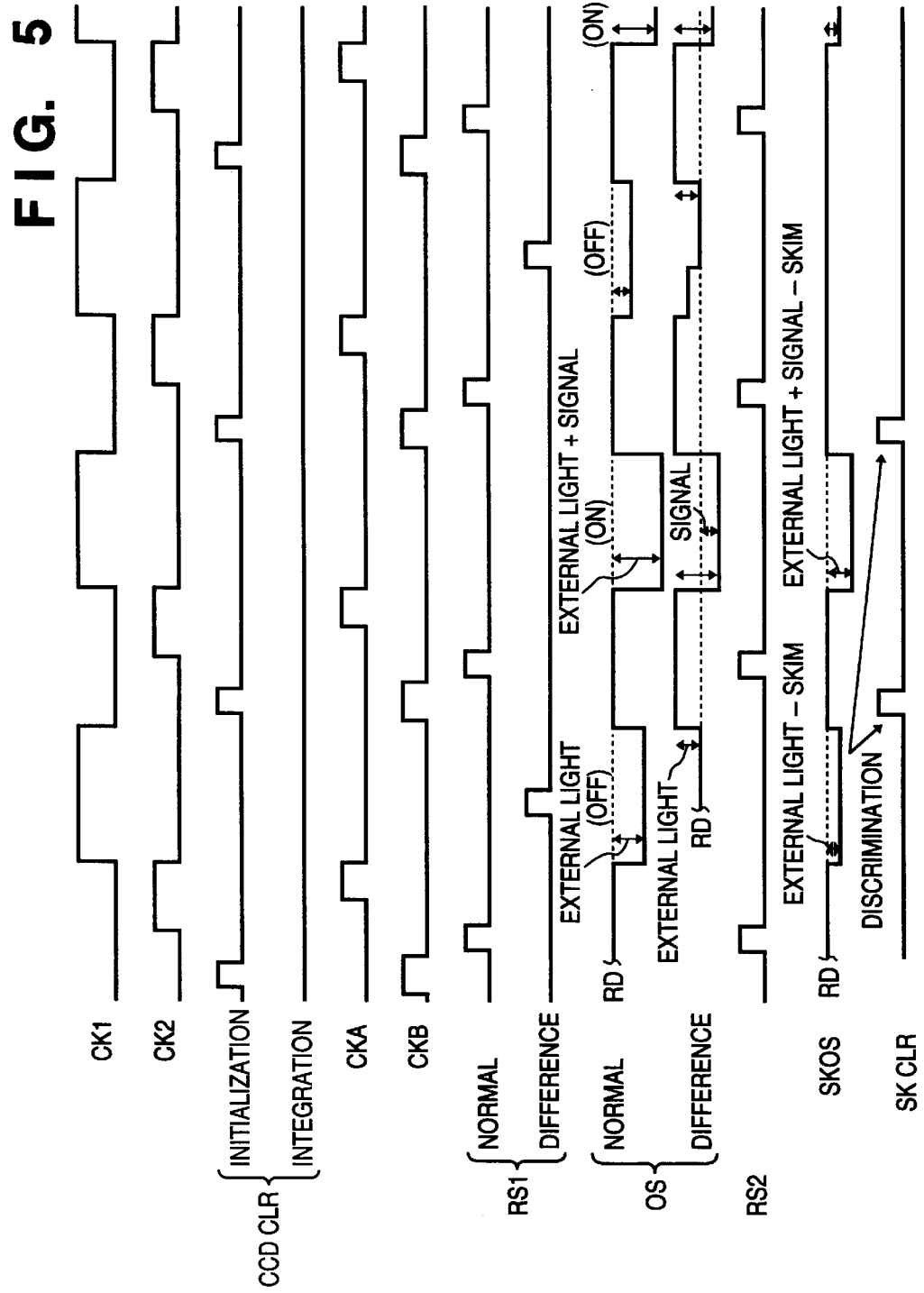
FIG. 5 is a timing chart showing the operation timing of the respective portions of a ring CCD in the device shown in FIG. 2.

In FIG. 5, each of a pulse $RS_1$ and an output OS has two modes, i.e., normal and difference modes. In these modes, depending on the output timing of the pulse $RS_1$ from the output portion 20, the absolute value of each CCD cell is to be output or the difference between the pair of charges corresponding to the light-projection ON and OFF periods is to be output. More specifically, in the former case, when the CCD cell $9_B$ as the output stage that stores no charge is reset by outputting a pulse $RS_1$, the absolute values of transferred charges are sequentially output. On the other hand, in the latter case, when the CCD cell $9_B$ that stores charges corresponding to the light-projection OFF period is reset by outputting a pulse $RS_1$, and when charges corresponding to the light-projection ON period are transferred in turn, a difference signal obtained by subtracting the charges corresponding to the light-projection OFF period from those corresponding to the light-projection ON period is output.

The charge transfer operation in the CCD will be explained below with reference to FIG. 5.

Charges in the CCD are transferred to a neighboring cell on a predetermined side in synchronism with clock signals $CK_1$ and $CK_2$. When a pulse CCDCLR is input, charges in the CCD cell $1_B$ are cleared. For this reason, upon initializing the CCD, as shown in the upper chart of the signal CCDCLR in FIG. 5, when a pulse CCDCLR is input in synchronism with a clock signal $CK_1$, cleared charges in the CCD cell $1_B$, i.e., a charge amount=0 is added to the amount of charges transferred from the linear CCD 17, and the charges from the linear CCD are directly transferred to the ring CCD. For this reason, in order to clear charges in the entire CCD upon initialization, a signal ICG is applied to the clear portions 13 to clear charges in the linear CCD 17, and charges are transferred while generating pulses CCDCLR in synchronism with clocks $CK_1$ until charges from the linear CCD 17 go around the ring CCD 18 once.

On the other hand, when no pulse CCDCLR is output, i.e., when the pulse CCDCLR is kept at LOW level, as shown in the lower chart of the signal CCDCLR in FIG. 5, every time charges go around the ring CCD 18, they are added to those transferred from the linear CCD 17. In the arrangement shown in FIG. 2, since the number of cells in the ring CCD and that of the linear CCD are equal to each other, i.e., 12, charge transfer to the linear CCD 17 is performed every 12 clocks. Hence, charges accumulated by identical accumulation portions are added to each other.

How to pick up an output signal OS will be explained below. The output signal OS has a voltage corresponding to charges in the CCD cell, i.e., a voltage corresponding to the intensity of light detected by the sensor array 11. For this reason, an image projected onto the sensor array is recognized as the voltage level of the signal OS. The distance to an object is measured by a principle to be described later using this image. Since charges accumulated in correspondence with the intensity of light detected by the sensor array represent the intensity of light, charges accumulated in the cell or a voltage output in correspondence with the accumulated charges will be simply referred to as light components. For example, when light projected from the IRED and reflected by an object is detected, and charges corresponding to the detected light are accumulated in the CCD, the accumulated charges or an output voltage corresponding to these charges will be simply referred to as "reflected light components" hereinafter. On the other hand, charges corresponding to external light or an output signal corresponding to these charges will be simply referred to as "external light components" hereinafter.

In the normal mode, charges in the CCD cell $10_B$ are transferred to the floating portion $9_B$ in response to a transfer pulse $CK_A$. Before this transfer operation, the voltage in the floating portion is set to RD in response to a reset signal $RS_1$. When charges in the cell $10_B$ are transferred to the cell $9_B$ in response to a transfer pulse $CK_A$, a voltage is output from the amplifier 101 in correspondence with the amount of transferred charges. In FIG. 5, assume that the cell $10_B$ initially stores a signal in the light projection OFF period. Therefore, as the signal OS, a signal corresponding to the intensity of ambient light, i.e., external light, is output. Thereafter, charges in the cell $9_B$ are transferred to the cell $8_B$ in response to a transfer pulse $CK_B$. Subsequently, the cell $9_B$ is reset to the level RD by a reset signal $RS_1$.

When charges corresponding to the intensity of light detected by the sensor array in the IRED ON state are transferred from the cell $10_B$ to the cell $9_B$ in response to the next clock of the transfer pulse $CK_A$, a voltage corresponding the charges transferred to the cell $9_B$, i.e., (external light components+reflected light components of projected light), is output in turn as the signal OS. More specifically, in the normal mode, charges in the ring CCD 18 are transferred each clock, and an output corresponding to (external light components) and an output corresponding to (external light components+reflected light components) are alternately obtained as the output signal OS.

On the other hand, when the reset signal $RS_1$ is driven in the difference mode, the signal OS is reset to the level RD while a signal corresponding to external light components is transferred to the cell $9_B$. More specifically, the signal OS is output with reference to charges corresponding to external light components as the reference level RD. Thereafter, when charges (level RD) in the cell $9_B$ are transferred to the cell $8_B$ in response to a transfer pulse $CK_B$, the potential of the signal OS becomes higher by external light components lost by transfer than the level RD. Subsequently, when charges corresponding to (external light components+ reflected light components) arrive at the cell $9_B$ in response to a transfer pulse $CK_A$, a signal corresponding to only (reflected light components) is output as a signal OS lower than the level RD. Therefore, when the reset signal is driven in the difference mode, only reflected light components corresponding to projected light are output as the signal OS upon every other transfer operations.

On the other hand, if charges sequentially transferred from the cell $9_B$ to the cell $8_B$ go around the ring CCD 18 several times and are accumulated, charges that overflow the capacity of the skim element $5_B$ ($SK_1$) flow into and are stored in the cell $DC_1$. Furthermore, charges in the cell $5_B$ are transferred to the cell $4_B$ with a smaller capacity in response to the next transfer pulse. Charges that overflow from the cell $4_B$ flow into the cell $DC_2$, and are added to charges transferred from the cell $DC_1$. More specifically, charges stored in the cell $6_B$ decrease by the capacity of the cell $4_B$, and thereafter, are stored in the cell $DC_2$. Note that the capacity of the cell $4_B$ is abbreviated as Cskm. In response to the next transfer pulse $CK_A$, charges in the cell $DC_2$ are supplied to the input terminal of the amplifier 102, and charges in the cell $4_B$ are transferred to the cell $3_B$. Prior to this transfer operation, the input terminal of the amplifier 102 is reset by a reset signal $RS_2$.

When charges in the cell $DC_2$ are transferred to the input terminal of the amplifier 102 in response to the transfer pulse $CK_A$, charges (external light components−Cskm) that overflow from the cell $4_B$ are detected as the voltage of a skim output signal SKOS. When it is determined that this voltage level is higher than a predetermined value, the cell $3_B$ is cleared by a clear signal SKCLR. In response to the next transfer pulse $CK_B$, charges at the input terminal of the amplifier 102 and those in the cell $3_B$ are transferred to the cell $2_B$. At this time, if the cell $3_B$ has been cleared, charges corresponding to only (external light components−Cskm) are accumulated in the cell $2_B$. In response to the next transfer pulse $CK_A$, charges corresponding to (external light components+reflected light components−Cskm) are transferred in turn to the input terminal of the amplifier 102. At this time as well, the Cskm components transferred from the cell $4_B$ are cleared from the cell $3_B$. For this reason, charges corresponding to (external light components+reflected light components−Cskm) are transferred to the cell $2_B$.

In this manner, when the amount of charges transferred to the skim portion 19 exceeds a predetermined amount, a predetermined amount of charges is skimmed therefrom. With this operation, even when dark currents are accumulated to increase while charges go around the ring CCD 18, they can be removed. For this reason, the signal to noise (S/N) ratio of signals that go around the ring CCD is free from deterioration.

With the above-mentioned arrangement, since the ring CCD 18 is arranged on a device, and charges can be added when they go around the ring CCD 18, the S/N ratio can be improved. Also, since the skim portion 19 for skimming external light components from the ring CCD 18 is arranged, the ring CCD 18 can be prevented from being saturated due to addition of charges, and the S/N ratio can be further improved.

Figure 25A:
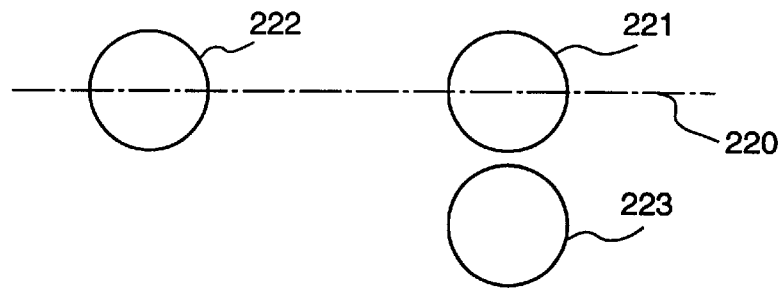
FIGS. 25A and 25B are views showing examples of the layouts of the conventional devices.
Figure 25B:
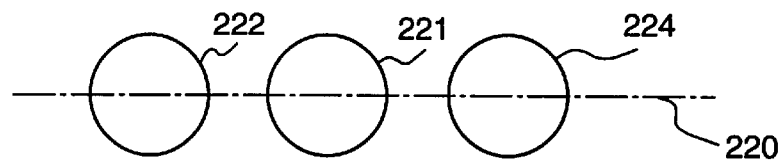
Figure 26A:
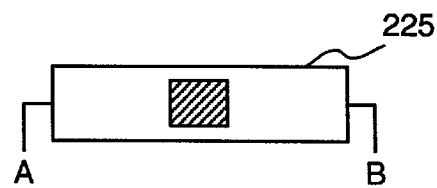
FIGS. 26A and 26B are views showing light-receiving portions (PSDs) of the devices shown in FIGS. 25A and 25B.
Figure 26B:
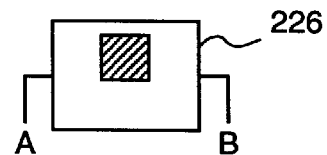

FIG. 6 shows an example of the layout of the distance measuring device shown in FIG. 1 in correspondence with FIGS. 25A and 25B that show the prior art. Referring to FIG. 6, light-receiving portions 71 and 72 correspond to the light-receiving lenses 101 and 102 shown in FIG. 1. A light projecting portion 73 corresponds to the projection lens 103 shown in FIG. 1, and is disposed at a position offset from a straight line representing the base length formed by the light-receiving portions 71 and 72. Although not shown in FIG. 6, a sensor array of the light-receiving portion 71 is disposed along the same straight line as a sensor array of the light-receiving portion 72, so that the longitudinal direction of the sensor array of the light-receiving portion 71 agrees with that of the sensor array of the light-receiving portion 72. FIG. 6 is illustrated in the same scale as in FIGS. 25A and 25B, and a size reduction of the device can be attained in this embodiment using the device shown in FIG. 1.

In FIG. 6, the light-receiving portions 71 and 72, and the light projecting portion 73 can be reduced in size as compared to those shown in FIGS. 25A and 25B for the following reason. More specifically, the performance of a device that receives a projected signal and performs a distance measurement is determined by the S/N ratio between the signal and noise. In this embodiment, since no circuit noise is generated upon accumulating signals unlike in the conventional device, and only signal components are skimmed, noise components become very small. Therefore, since signal components can be decreased accordingly to obtain the same S/N ratio as in the conventional device, a size reduction of the light-receiving portions 71 and 72, and the light projecting portion 73 can be realized.

Also, in FIG. 6, the base length formed by the light-receiving portions 71 and 72 can be shortened as compared to those in FIGS. 25A and 25B for the following reason. More specifically, when a PSD is used as a sensor as in the conventional device, the moving amount of an image must be detected within the total length of the sensor. For this reason, if a relatively large moving amount of an image on the sensor cannot be assured, the distance measurement precision corresponding to the moving amount is impaired. In contrast to this, in this embodiment, since the light-receiving portion uses a sensor array, each sensor can have a small width, and can sensitively detect movement of an image. That is, this arrangement is equivalent to an arrangement using a single sensor which is divided into a plurality of sensors to attain high resolution. For this reason, the moving distance of an image can be obtained with high precision, i.e., the distance measurement precision can be improved, and the base length can be shortened.

In FIG. 6, even when the light projecting portion 73 is offset from the base length formed by the light-receiving portions 71 and 72, the entire arrangement is designed, so that a received light image 82 includes the height direction of a sensor with respect to a sensor array 81, as shown in FIG. 7. Hence, the distance measurement can be realized without sacrificing any performance. As can be understood from this fact, in this embodiment, the degree of freedom in the layout of the light projecting portion with respect to the light-receiving portions is high, thus allowing an efficient layout even in a small apparatus such as a camera.

<Distance Measuring Range>

The distance measuring range of the distance measuring apparatus of this embodiment will be described below.

A case will be described below wherein the sensor array is short. FIG. 8 illustrates objects a, b, and c within the photographing region of a camera, and the distance measuring region of the distance measuring device indicated by "[" 92 and "]" 91. Note that an arrow 90 represents the relative length of the sensor array described in FIGS. 1 and 2. In this case, since the sensor array is short, only object b can be subjected to a distance measurement, and when this distance measuring device is built in a camera to attain focusing control, objects a and c having different distances from that of object b are in an out-of-focus state. Furthermore, when object b is not present, the focusing state of the camera is adjusted to the infinity distance, resulting in a picture in a considerable out-of-focus state.

Figure 11A:
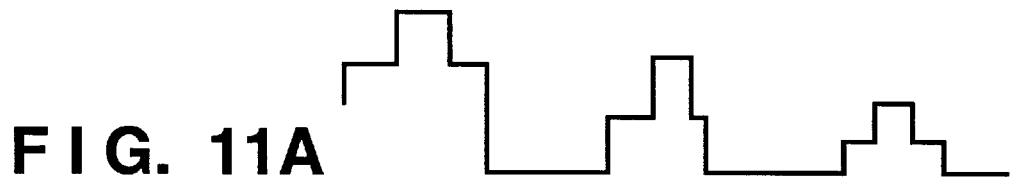
FIGS. 11A, 11B, and 11C are views for explaining the effects of the device shown in FIG. 10.
Figure 11B:

A case will be described below with reference to FIG. 9 wherein the distance measuring range is broadened by increasing the length of the sensor array. In FIG. 9, the distance measuring region of the distance measuring device is indicated by "[" 94 and "]" 93, and the relative length of the sensor array is indicated by an arrow 95. In this case, two sensor arrays respectively output image signals, as shown in FIG. 11B. In this case, the positions of the image signals from the two sensor arrays are offset in the right-and-left direction by amounts corresponding to distances from the camera to objects a, b, and c, and these offset amounts (relative values of the positions) represent the distances. However, when the correlation is calculated using the entire image signal, perspective conflict occurs, and the distance measurement is disabled. On the other hand, although a method of narrowing the correlation calculation region upon occurrence of perspective conflict has been proposed, processing is complicated. In this case, only the image signals of objects a, b, and c are illustrated. However, in practice, since a background pattern also appears as an image signal, it is very difficult to specify a region that does not cause any perspective conflict.

Figure 10:
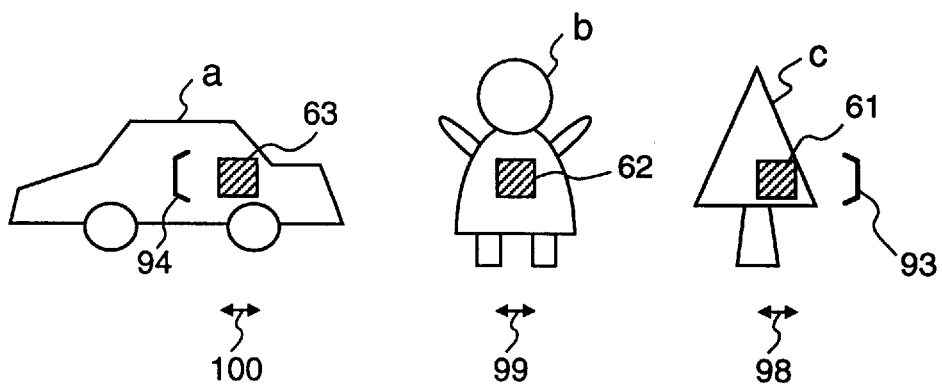
FIG. 10 is a view for explaining the distance measuring range in an embodiment of the present invention.

FIG. 10 shows a case wherein the light projecting portion uses a plurality of light-emitting portions that emit multiple beams in the distance measuring device shown in FIG. 1. Projected images 61, 62, and 63 are selectively or simultaneously projected from the light projecting portion, and appear as signals in regions 98, 99, and 100 in the sensor array. The distance measuring device of this embodiment senses an image in both the light-projection ON and OFF periods. Image signals in the light-projection ON period appear, as shown in FIG. 11A, and image signals in the light-projection OFF period appear, as shown in FIG. 11B. Since the distance measuring device of this embodiment detects the position of a signal obtained in the light-projection ON period, the relative values of the positions of the image signals are calculated by performing a correlation calculation using image signals shown in FIG. 11C as the difference between those shown in FIGS. 11A and 11B.

Figure 11C:
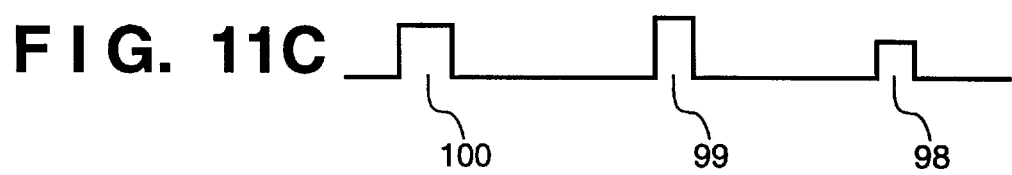

As can be seen from FIG. 11C, the image signals shown in FIG. 11C include only information of the distances to objects a, b, and c, and pattern information of objects a, b, and c is canceled. That is, the distance measuring region is specified by image signals from the regions 98, 99, and 100 even when the region to be subjected to distance measurement is not specified. By selectively projecting light spots, the regions 98, 99, and 100 can be arbitrarily selected, and a distance measurement can be attained even when a correlation calculation region is not selected. Even when a plurality of light beams are simultaneously emitted, peaks of correlation values are merely generated at three positions, and the distances to objects a, b, and c can be obtained by calculating the distances on the basis of the relative values of the positions of the respective peak values.

When the luminance of external light is high, and the integral time is shortened, or when the object is far and has a low reflectance, it is often difficult to detect signals shown in FIG. 11C since the projected light signal obtained by a single measurement is very weak. Therefore, in order to realize the above-mentioned effect, a device preferably comprises a function of adding charges and skimming a predetermined amount of charges using the ring CCD, as has been described above with reference to FIG. 2.

<Principle of Correlation Distance Measurement>

The distance measuring device of the present invention performs correlation distance measurements by calculating the correlation between images sensed by two sensor arrays, and the calculating the distance on the basis of the relative positional relationship between the images on the two sensors. The principle of correlation distance measurement will be briefly described below.

Figure 22A:
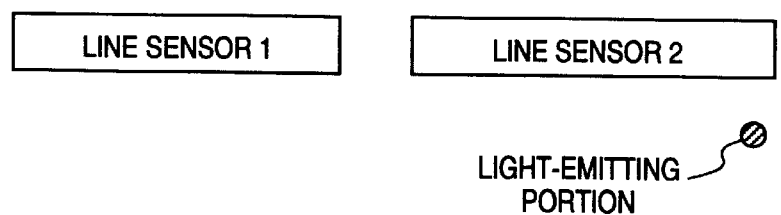
FIGS. 22A and 22B are views showing the distance measurement principle of the distance measuring device.
Figure 22B:
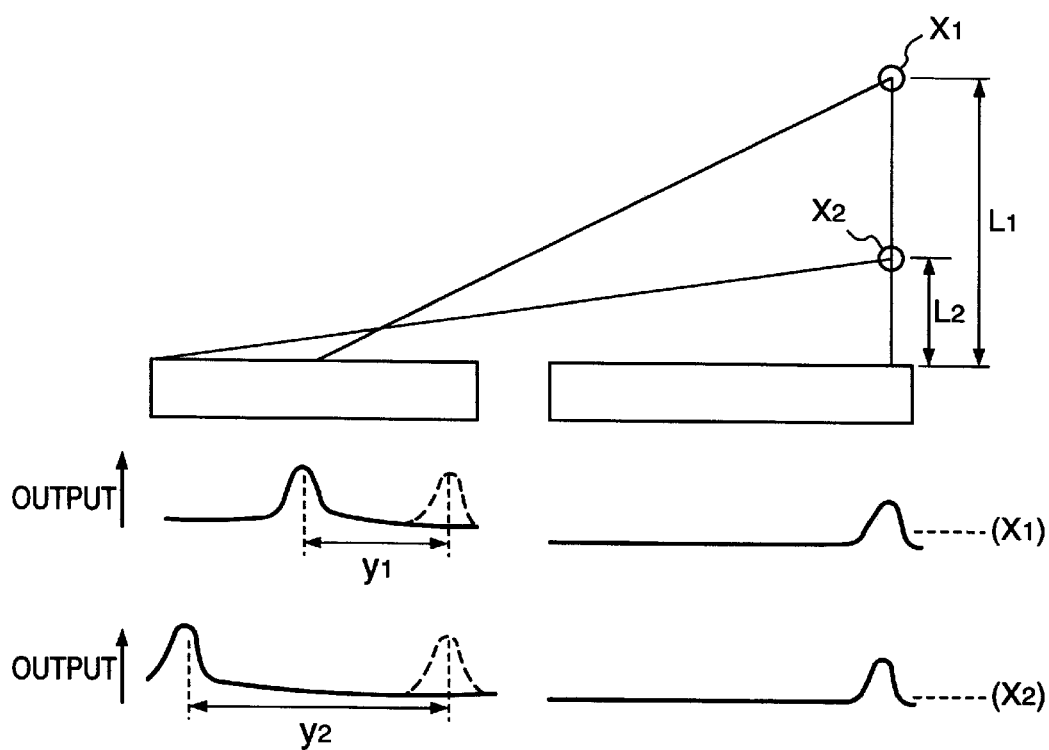
Figure 23:
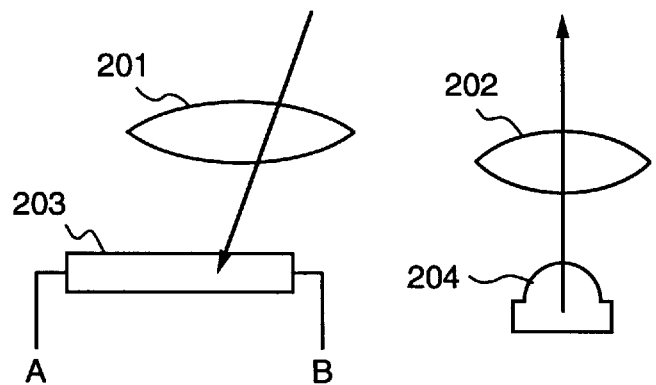
FIG. 23 is a schematic view showing the measurement principle of a conventional distance measuring device.
Figure 24:
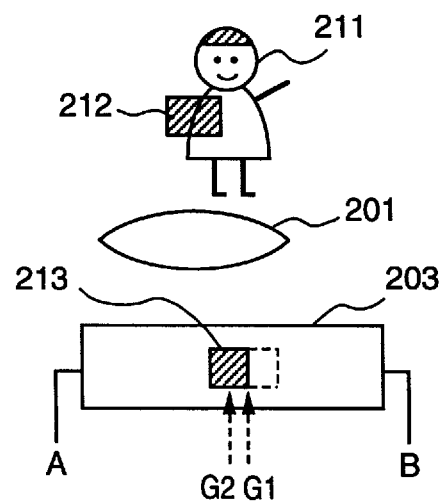
FIG. 24 is a view for explaining the error generation principle of the device shown in FIG. 23.

FIG. 22A shows the layout of two line sensors 1 and 2 serving as light-receiving portions, and a light-emitting portion. Line sensors 1 and 2 detect images imaged by a light-receiving lens (not shown). In this case, the relative positions of images differ depending on the base length of the two line sensors, as shown in FIG. 22B. On line sensor 1, images are formed at the right end in correspondence with objects X1 and X2. On line sensor 2, an image of object X1 is formed at nearly the central position, and an image of object X2 is formed at the left end. Based on offset amounts y1 and y2 between the positions of the images on the two sensors, the distances to objects X1 and X2 are determined.

<Arrangement of Distance Measuring Device and Distance Measurement Procedure>

Figure 19:
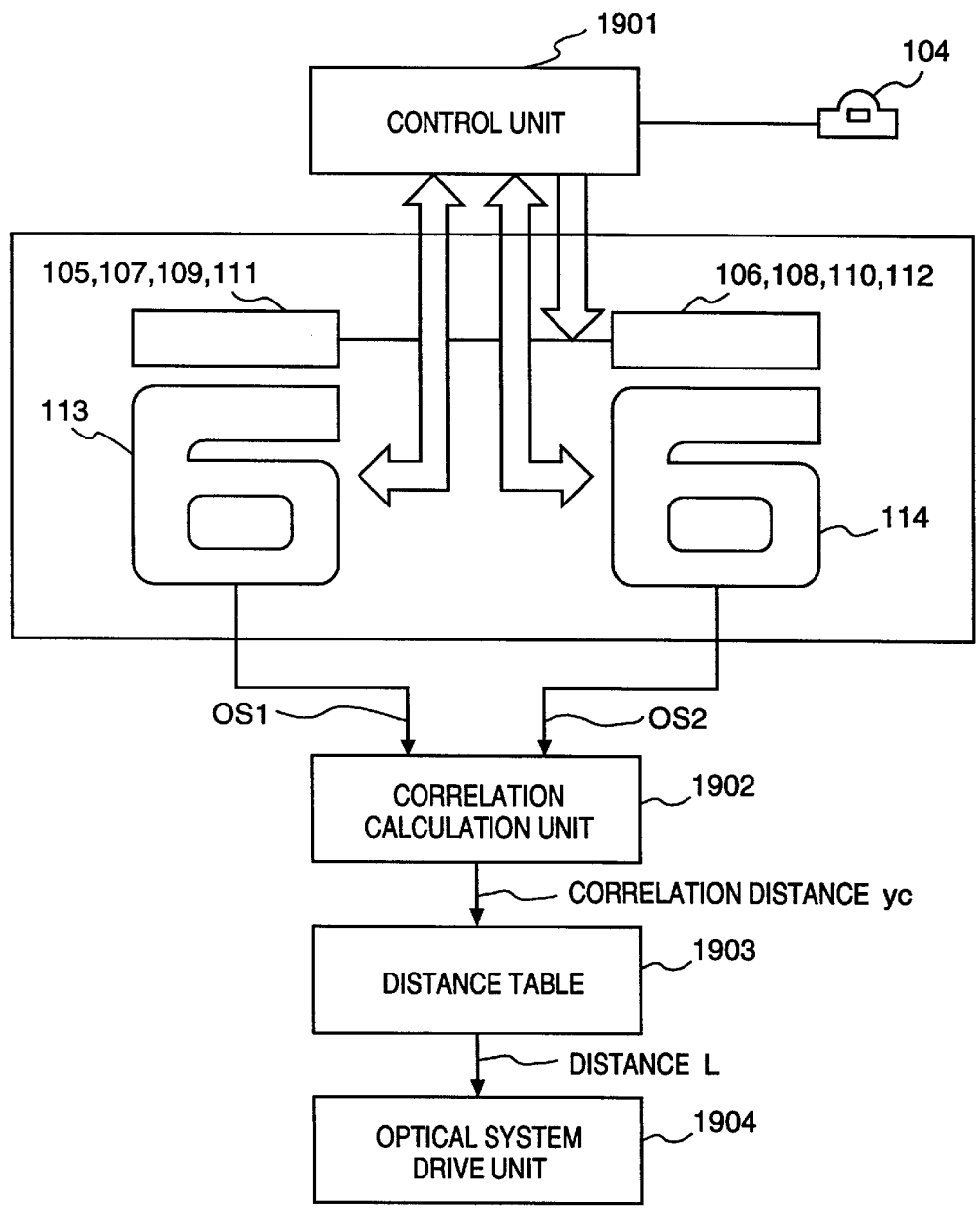
FIG. 19 is a block diagram showing the arrangement of the distance measuring device.

The distance measuring device that realizes the above-mentioned distance measurement procedure and principle have an arrangement shown in FIG. 19. Referring to FIG. 19, a control unit 1901 controls the entire device, and controls a sensor unit 1905 and the IRED 104, as shown in FIG. 4 or 5 above, thus picking up the output signal OS from the CCD. The sensor unit 1905 has the arrangement shown in FIG. 1, and the intensities of light detected by the sensor arrays 105 and 106 are circulated and accumulated as charges through the ring CCDs 113 and 114. Outputs $OS_1$ and $OS_2$ from the two CCDs 113 and 114 represent images projected onto the sensor arrays. A correlation calculation unit 1902 calculates a distance yc between an image of an object detected by the sensor array 105 and an image of an object detected by the sensor array 106 on the basis of a principle to be described later. A distance table 1903 registers the distance yc and a distance L to an object corresponding to the distance yc. The distance table 1903 converts the distance yc between the images calculated by the correlation calculation unit 1902 into the distance L to an object. An optical system drive unit 1904 drives the optical system in correspondence with the calculated distance L to the object, thus attaining a focusing operation.

The procedure of measuring the distance using the above-mentioned arrangement will be explained below.

The correlation calculation unit 1902 includes a circuit shown in FIG. 20. As the output signal $OS_2$, pixels of images respectively detected in the IRED ON and OFF periods are alternately output in units of clocks. In this case, the reset signal $RS_1$ is driven at the timing of the difference mode. That is, the signal $OS_2$ represents a value obtained by subtracting the value of an image signal obtained in the IRED OFF period from the value of an image signal obtained in the IRED ON period, and corresponds to that shown in FIG. 1C. At the same timing as the transfer timing of a signal to a shift register 202, the contents of the shift register 202 are shifted. The number of digits of the shift register 202 is equal to that of the sensor array. In this manner, the shift register 202 stores only reflected light components corresponding to the IRED ON periods, i.e., the signal shown in FIG. 11C. This shift register is assumed to be a multi-value shift register, one digit of which indicates the output level of the output signal OS. In the case of a binary shift register, one digit is constituted by a plurality of bits.

The signal $OS_2$ has been described, and the same applies to the signal $OS_1$. However, a shift register 201 can shift its contents by a required number of digits to calculate the correlation.

The shift register 201 receives a value y from a counter 204, and shifts its contents to the right by y digits. $OS_1(y)$ represents the signal $OS_1$ which has been shifted by y digits. A subtracter 203 subtracts the contents of the shift register 201 from those of the shift register 202 in units of digits. In FIGS. 19 and 20, each sensor array has 200 pixels, and the number of digits of each shift register is also 200.

For example, when the signal $OS_2$ from line sensor 2 is expressed by a curve 2102 in FIG. 21, and the signal $OS_1$ from line sensor 1 is expressed by a curve 2101 in FIG. 21, the signals $OS_1$ and $OS_2$ are respectively temporarily stored in the shift registers 201 and 202, and thereafter, $Z(y)=OS_2-OS_1(y)$ is calculated by the subtracter 203. Since the initial value of the shift amount y is zero, $Z(0)$ is initially obtained. Since $Z(y)$ is obtained in units of digits, a value representing the correlation is obtained by adding the absolute values of $Z(y)$ for all the digits.

The count value of the counter is incremented by 1 in response to a clock to set y=1, thereby shifting data in the shift register 201 by one digit. In the shift register 201, data are shifted to the right by one digit, i.e., one pixel of the sensor array, and a curve 2103 shown in FIG. 21 is obtained.

On the other hand, since the signal $OS_2$ is stored in the shift register 202 without being shifted, when $Z(1)=OS_2-OS_1(1)$ is calculated by the subtracter 203, the value $Z(1)$ at that time is obtained. The obtained value is stored and held.

By executing this step sequentially, values $Z(0)$ to $Z(100)$ shifted by 100 digits to the right are obtained. Of these values $Z(0)$ to $Z(100)$, a minimum value is obtained, and a shift amount y corresponding to this minimum value becomes the distance yc between the image sensed by the sensor array 105 and the image sensed by the sensor array 106. For example, if $Z(50)$ yields a minimum value, it is determined that the signals $OS_1$ and $OS_2$ are offset by 50 pixels, and yc=50 is obtained.

By performing a correlation calculation between the two image signals $OS_1$ and $OS_2$, and searching for y with the highest correlation, the offset amount between the two images is detected. A distance corresponding to the obtained distance yc is read out from the distance table 1903, thereby obtaining the distance L from the distance measuring device to the object. Note that the relationship between yc and the distance L to the object is measured in advance, and is stored in advance in the distance table 1903.

Figure 28:
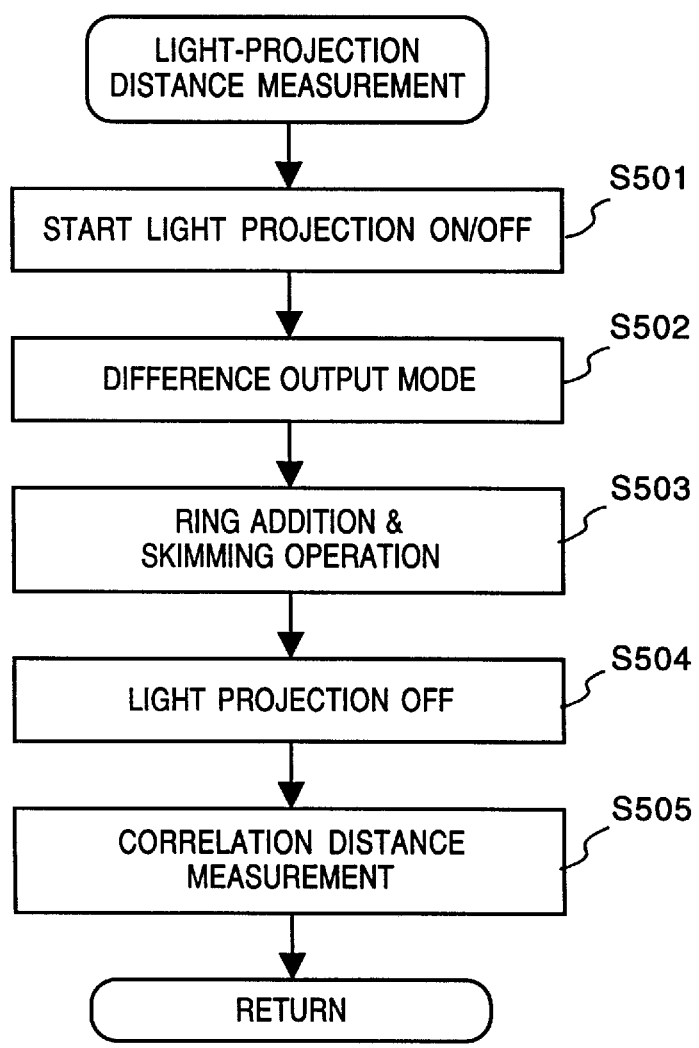
FIG. 28 is a flow chart showing the light projection distance measuring operation in FIG. 27.

This procedure will be described below with reference to the flow chart shown in FIG. 28. FIG. 28 shows the control procedure of the control unit 1901 upon executing the above-mentioned distance measurement.

In step S501, the ON/OFF operation of the IRED is started. The ON/OFF timing is as shown in FIG. 4. In step S502, the difference mode is selected. In the difference mode, the signal $RS_1$ is driven in the difference mode. Therefore, as the output signal $OS_1$, a signal with reference to the signal level of an image sensed in the IRED OFF period is output. In step S503, the respective signals are controlled, as described above with reference to FIGS. 4 and 5. More specifically, image signals are circulated through the ring CCDs 113b and 114b, while the signals in the linear CCDs 113a and 114a are added in synchronism with the circulation, and signal components corresponding to dark currents are removed by the skim portions 117 and 118. In this manner, while signal charges are accumulated, the output signal OS is monitored and is compared with a predetermined value. When the signal OS exceeds the predetermined value, the IRED is turned off in step S504. Finally, in step S505, the distance to the object is measured using the correlation calculation unit 1902 and the distance table 1903.

In the above description, the correlation calculation is performed using $Z(y)=OS_2-OS_1(y)$. However, the present invention is not limited to this. For example, a correlation calculation may be performed using $W(y)=OS_2 \times OS_1(y)$. In this case, the shift amount that yields a maximum sum of $W(y)$ for the respective digits corresponds to a maximum correlation between two images.

In this manner, the distance to an object can be measured.

In the distance measuring device of this embodiment, the correlation between two images sensed by the two sensor arrays is calculated, and the distance to an object is measured based on the offset amount between the two images, i.e., the relative positional relationship therebetween. For this reason, even when the barycentric position of an image on the sensor array is offset, high-precision distance measurement can be realized.

Since the ring CCDs are used, the S/N ratio of the detected image signal can be improved, thus allowing a size reduction of the device.

Images corresponding to both the light-projection ON and OFF states are detected, and the difference between these images is used for determining the relative positional relationship of an object. For this reason, when light is projected onto an object, the distance to which is to be measured, the distance to the object can be precisely measured without causing any perspective conflict.

An example in which the two ring CCDs shown in FIG. 1 have opposite charge rotation directions will be explained below with reference to FIG. 12.

Figure 12:
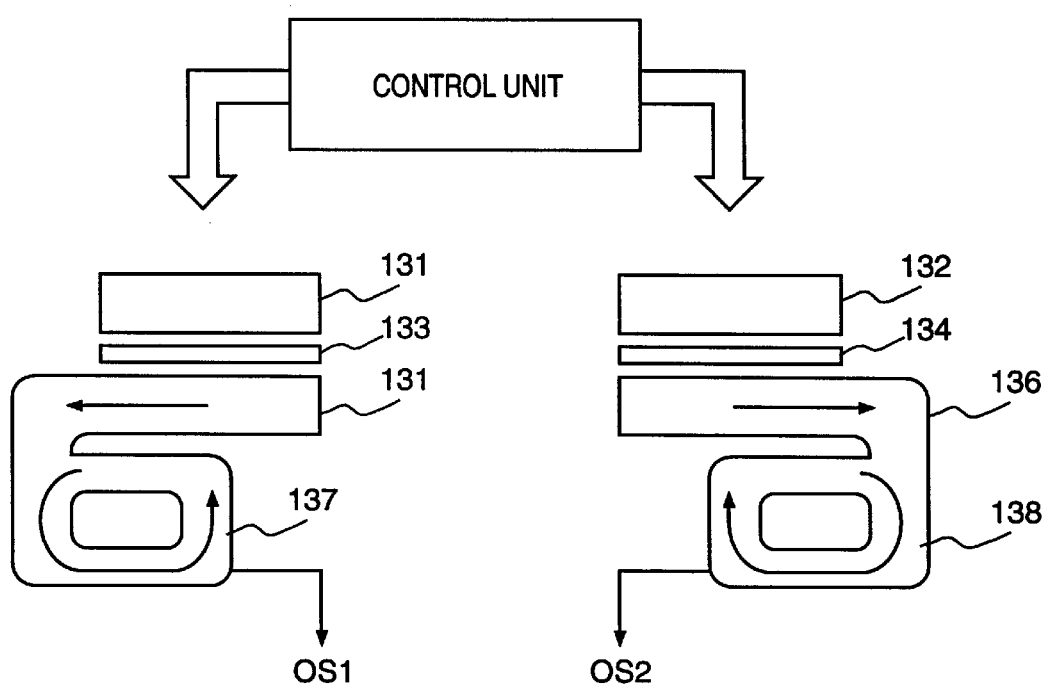
FIG. 12 is a view showing an embodiment in which two ring CCDs have opposite charge rotation directions.

Referring to FIG. 12, reference numerals 131 and 132 denote first and second sensor arrays; 133 and 134, first and second charge accumulation units; and 135 and 136, first and second charge transfer units. In a ring CCD 137 of the first charge transfer unit 135, charges go around counterclockwise, and in a ring CCD 138 of the second charge transfer unit 136, charges go around clockwise.

Figure 13A:
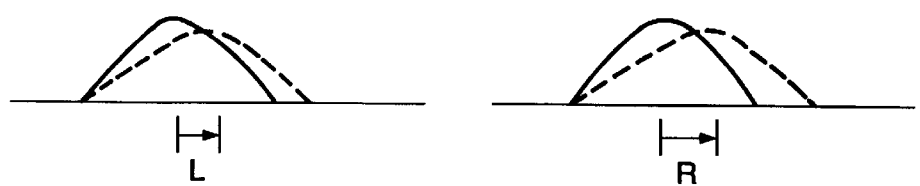
FIGS. 13A and 13B are views for comparing the effects of the devices shown in FIGS. 12 and 1.
Figure 13B:
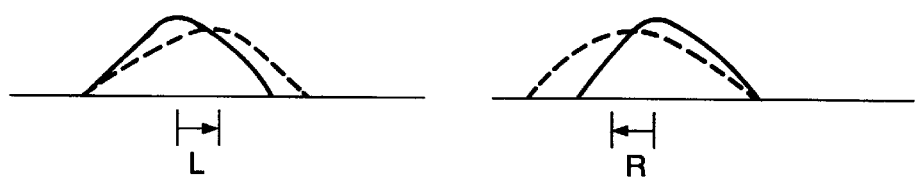

FIG. 13B shows image signals obtained in this arrangement. Referring to FIG. 13B, L indicates an image signal from the ring CCD 137, and R indicates an image signal from the ring CCD 138. In FIG. 13B, the solid curves represent image signals obtained when the transfer efficiency of the ring CCDs 137 and 138 is 100%. However, if the transfer efficiency of the ring CCDs 137 and 138 is lower than 100%, image signals gradually leak to the transfer stages on the rear side, and image signals indicated by the broken curves are obtained. As a result, the barycentric positions of images are offset inwardly, as indicated by arrows (→, ←), and a wrong distance is obtained. On the other hand, since projected light spot images corrupt in opposite directions, errors are generated upon calculating the correlation.

On the other hand, when the two ring CCDs have the same charge transfer direction, as shown in FIG. 1, even when the transfer efficiency of the ring CCDs is lower than 100%, as shown in FIG. 13A, since the barycentric positions of image signals L and R move in the same direction, correct distance information can be obtained. Therefore, image signals need not be corrected by a calculation. Furthermore, since the image signals of projected light spots change similarly, the correlation can be calculated using these signals.

As described above, when the two ring CCDs have the same rotation direction, as shown in FIG. 1, the distance measurement result is not influenced by signal leakage.

[Second Embodiment]

Another embodiment of the present invention will be described below. In this embodiment, a multi-point distance measurement with a broad field of view is realized without increasing the sensor array length.

Figure 14:
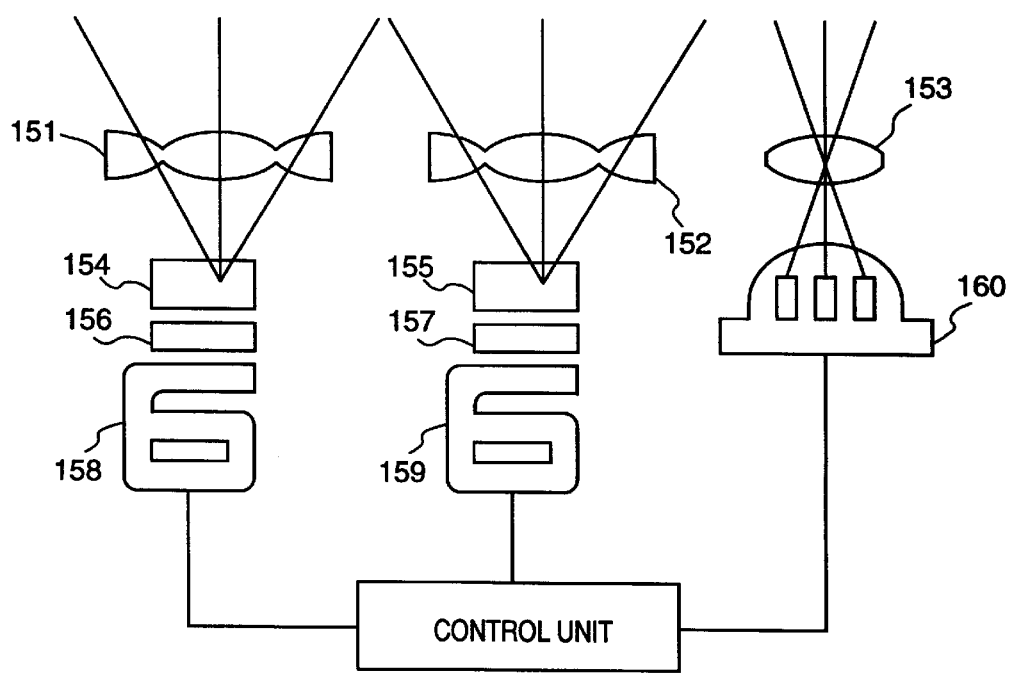
FIG. 14 is a schematic view showing a distance measuring device for realizing multi-point distance measurements according to the second embodiment.

Referring to FIG. 14, reference numerals 151 and 152 denote light-receiving lenses each having a plurality of (three) optical axes, and images corresponding to the three optical axes are received on each of sensor arrays 154 and 155 (corresponding to the sensor arrays 105 and 106 in FIG. 1). Reference numerals 156 and 157 denote charge accumulation units (corresponding to the charge accumulation units 109 and 110 in FIG. 1); and 158 and 159, charge transfer units (corresponding to the charge transfer units 113 and 114 in FIG. 1) such as CCDs having ring-shaped portions. Reference numeral 153 denotes a projection lens (corresponding to the projection lens 103 in FIG. 1); and 160, a light-emitting element which has a plurality of (three) light-emitting portions and can project light spots in three directions via the projection lens 153. The light-emitting element 160 selectively or simultaneously projects light spots under the control of a control unit.

Image signals on the sensor arrays 154 and 155 in the distance measuring device shown in FIG. 14 will be described below with reference to FIGS. 15A to 15E. FIG. 15A shows an image signal from the central optical axis of each of the light-receiving lenses 151 and 152, and a hatched projecting portion 181 represents the reflected light signal of a projected light spot. FIG. 15B shows an image signal from the left optical axis of each of the light-receiving lenses 151 and 152, and a projecting portion 182 represents the reflected light signal of a projected light spot. FIG. 15C shows an image signal from the right optical axis of each of the light-receiving lenses 151 and 152, and a projecting portion 183 represents the reflected light signal of a projected light spot. Image signals shown in FIGS. 15A to 15C formed by external light other than the projecting portions 181, 182, and 183 are different from each other since the three optical axes have different incident angles on each of the sensor arrays 154 and 155. More specifically, an image signal corresponding to the light-projection OFF period is obtained by excluding the projecting portions 181, 182, and 183 from the entire image signals shown in FIGS. 15A to 15C.

Since an actual image signal is obtained by superposing the signals shown in FIGS. 15A to 15C, as shown in FIG. 15D, and external light 184 is a signal as a pile of perspective conflicts, this image signal cannot be used in distance measurements. However, an image signal obtained by calculating the difference between signals corresponding to the light-projections ON and OFF periods has no external light components, as shown in FIG. 15E, and the distances of the respective projected light spots can be calculated using this signal. The arrangement for realizing this calculation is the same as that shown in FIGS. 19 and 20. Note that the length of each of the sensor arrays 154 and 155 is set not to substantially overlap the angles of the three optical axes. For this reason, a light spot projected from one point of the light-emitting element 160 is received on each of the sensor arrays 154 and 155 from only one of three portions (corresponding to the three optical axes) of each of the light-receiving lenses 151 and 152. Therefore, since only one image is generated in correspondence with one light spot, the distance can be easily calculated. Even when a plurality of images are generated by one light spot, since the three optical axes of each of the light-receiving lenses 151 and 152 have different angles, the images of the projected light spot are generated at sufficiently separated positions on each of the sensor arrays 154 and 155. Therefore, an image to be subjected to a correlation calculation can be easily extracted from each of the sensor arrays 154 and 155.

Another arrangement of the charge transfer units 113 and 114 shown in FIG. 1 will be explained below with reference to FIGS. 16 and 17. This example can be applied to all the embodiments other than this embodiment.

Figure 16:
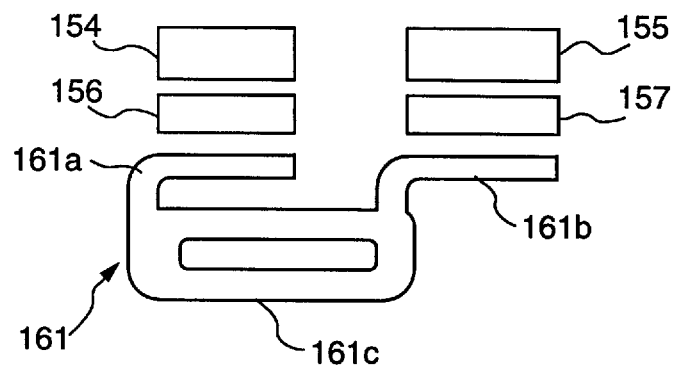
FIG. 16 is a schematic view showing a distance measuring device according to another embodiment of the present invention.

In the arrangement shown in FIG. 16, a charge transfer unit 161 is constituted by a linear CCD 161a which opposes the sensor array 154 and the charge accumulation unit 156, a linear CCD 161b which opposes the sensor array 155 and the charge accumulation unit 157, and a ring CCD 161c which is formed into an annular shape to be contiguous with the linear CCDs 161a and 161b. The ring CCD 161c may have an initialization circuit, a skim portion, an OS signal output portion, and the like, which are described above with reference to FIG. 1 and are used commonly to charge signals from the two sensor arrays 154 and 155. In the ring CCD 161c, signals received from the sensor array 154 via the linear CCD 161a, and signals received from the sensor array 155 via the linear CCD 161b may be independently and sequentially added.

In this manner, only one ring CCD can be used as long as it has cells that can accumulate signals from the two sensor arrays.

Figure 17:
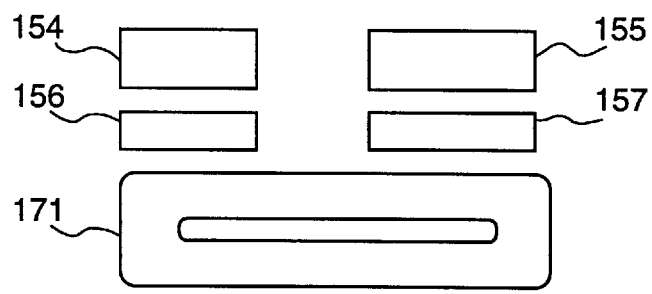
FIG. 17 is a schematic view showing a distance measuring device according to still another embodiment of the present invention.

In the arrangement shown in FIG. 17, a charge transfer unit 171 is formed into a single ring shape as a whole, so that a portion opposing the sensor array 154 and the charge accumulation unit 156, and a portion opposing the sensor array 155 and the charge accumulation unit 157 are contiguous with each other. The charge transfer unit 171 may also have an initialization circuit, a skim portion, an OS signal output portion, and the like, which are described above with reference to FIG. 1 and are used commonly to charge signals from the two sensor arrays 154 and 155. In the charge transfer unit 171, signals from the sensor array 154, and signals from the sensor array 155 may be independently and sequentially added.

In this manner, a single ring CCD having no linear CCD portion can be used as long as charges from the sensor arrays are added to those in the CCD.

Figure 18:
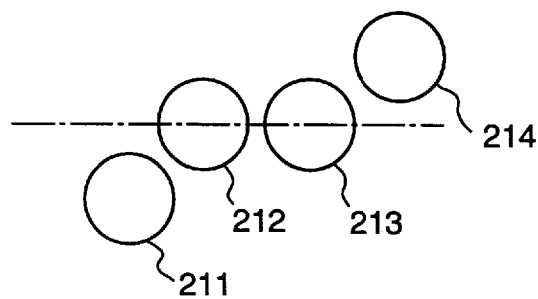
FIG. 18 is a view showing another layout of the device of the present invention.

FIG. 18 shows an example in which a plurality of light projecting portions 211 and 214 used for multi-point distance measurements are disposed at positions offset from the base length, as shown in FIG. 6. The distance measuring device of this embodiment has a high degree of freedom since it measures the distance on the basis of the positional relationship between images on two light-receiving portions. Hence, a flexible layout shown in FIG. 18 is allowed, and the device can be easily built in a compact equipment such as a camera.

As described above, according to the present invention, since two sensor arrays are used, even when an image of projected light is partially omitted, errors can be canceled, and accurate distance measurements can be attained.

Also, the degree of freedom in layout of the device can be increased, and a size reduction of the device can be attained.

[Third Embodiment]

The operation of a distance measuring device according to the third embodiment of the present invention will be described below. For example, the control procedure for measuring the distance to an object in, e.g., a camera will be explained below with reference to FIG. 27.

The device of this embodiment has the same arrangement as in the first embodiment shown in FIGS. 1 to 5 and FIG. 19, and FIGS. 27 to 29 show the control sequence of the control unit 1901.

When the distance measurement is started, it is checked in step S101 if the amount of charges from the sensor arrays 101 and 102 per light projection, which amount is determined by the luminance of external light and the electronic shutter function of the clear portions 107 and 108, is smaller than the predetermined charge skimming amount in the skim portions 117 and 118. If Y (YES) in step S101, the ring CCDs 113b and 114b are allowed to add charge signals corresponding to reflected light of the projected light spot, and the flow advances to step S102. On the other hand, if N (NO) in step S101, the flow advances to step S104. Note that light, reflected by an object, of the projected light spot will also be simply called a projected light spot hereinafter.

In step S102, a distance measurement is performed on the basis of the correlation using an image signal output as the difference between images corresponding to the light-projection ON and OFF periods (see FIG. 28), and the flow advances to step S103. It is checked in step S103 if the distance measurement value is obtained in step S102. When a signal of the projected light spot cannot be obtained since, for example, the object to be measured is located at a position separated by a far distance or has a low reflectance, it is determined that the distance measurement is impossible to attain, and the flow advances to step S104. Otherwise, the distance measurement ends.

In step S104, the projection of a light spot is stopped, an image signal of the object to be measured is obtained without projecting any light spot, and a distance measurement is performed based on the correlation (see FIG. 29) to obtain a distance measurement value, thus ending the distance measurement. In this case, charges are neither circulated through the ring CCDs nor added to charges from the linear CCDs.

Figure 27:
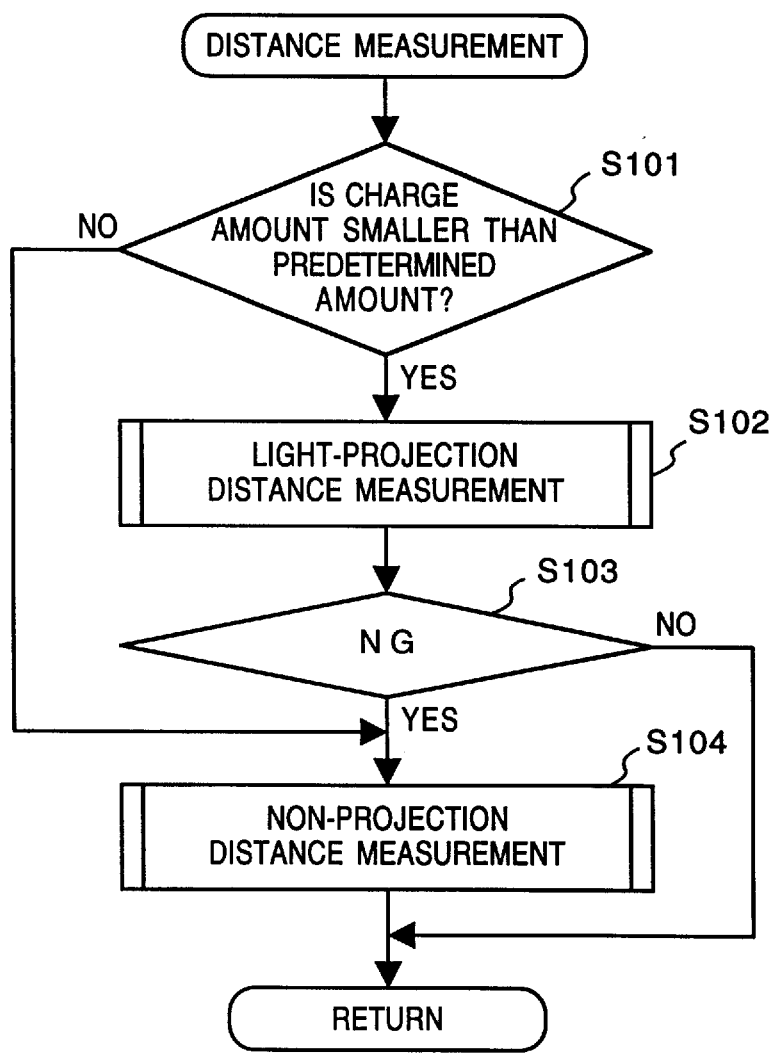
FIG. 27 is a flow chart showing the operation of the distance measuring device of the third embodiment.

FIG. 28 is a flow chart showing the operation of the light-projection distance measurement (first processing) executed in step S102 in FIG. 27. This distance measurement method is nothing but a method executed by the device of the first embodiment. In step S501, the ON/OF projection operation of a light spot is started. In step S502, the output mode of the output signal OS shown in FIG. 5 is switched to the difference mode. In step S503, the ring CCDs 113b and 114b add charges in synchronism with the ON/OFF periods of the projected light spots. The ring CCDs 113b and 114b are prevented from being saturated by skimming external light components using the skim portions 117 and 118. When the difference output OS exceeds a predetermined amount while monitoring the signal output OS, the projection operation is turned off in step S504. In step S505, the correlation of the projected light spot signals is calculated based on the difference outputs output from the two light-receiving portions, thus obtaining a distance measurement value (correlation distance measurement). More specifically, the distance to the object to be measured is calculated using the principle of the trigonometric measurement on the basis of the difference between the relative values of the positions on the two sensor arrays.

Figure 29:
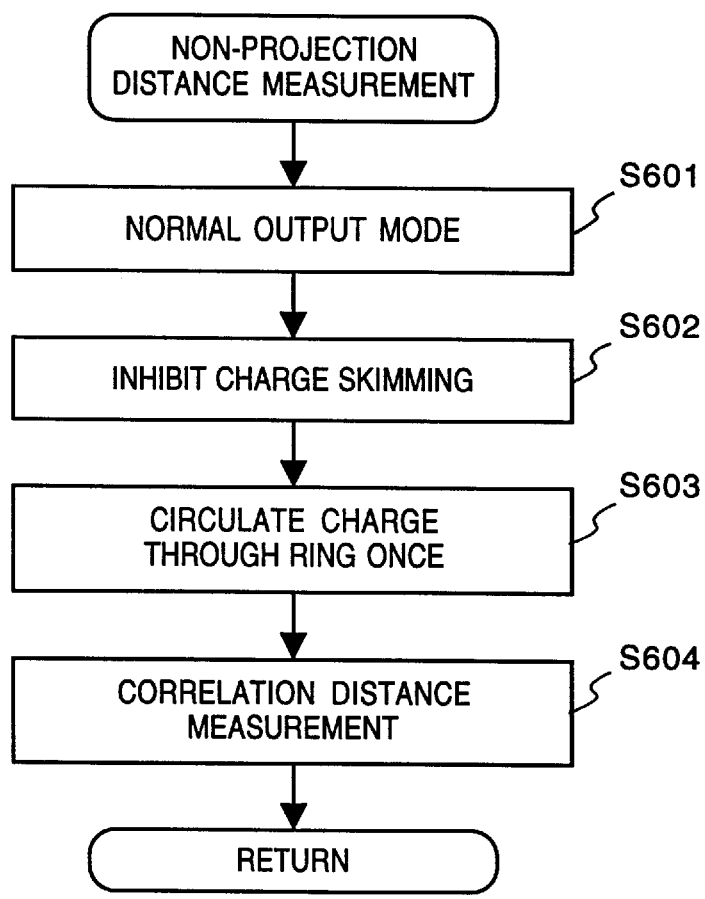
FIG. 29 is a flow chart showing a non-projection distance measuring operation in FIG. 27.

FIG. 29 is a flow chart showing the operation of the non-projection distance measurement (second processing) executed in step S104 in FIG. 27. In step S601, the output mode of the output signal OS in FIG. 5 is switched from the difference mode to the normal mode. In step S602, the charge skimming operation is inhibited. That is, a charge in the cell $3_B$ is not cleared irrespective of the value of the signal SKOS. In step S603, charges go around the ring CCDs 113b and 114b once to obtain image signals for one light projection from the sensor arrays 105 and 106 as output signals OS. In step S604, the correlation of the image signals obtained by the two sensor arrays in step S603 is calculated, thereby obtaining a distance measurement value (correlation distance measurement). More specifically, the distance to the object to be measured is calculated using the principle of the trigonometric measurement on the basis of the relative values of the positions on the sensor arrays of the signals from the two sensor arrays. This step is executed in the same manner as in FIG. 28. Note that the reason why signal charges are caused to go around the CCDs once is to prevent generation of distance measurement errors due to an offset of image signals and to assure accurate distance measurements.

The correlation distance measurement method in step S505 in FIG. 28 and in step S604 in FIG. 29 will be explained below. In this correlation distance measurement, after the signal OS is read out from the output portion 20 shown in FIG. 2, A/D conversion is started in response to a signal SH to read out data for a round of the ring CCD 18. Furthermore, after corresponding signals in the cells $1_A$ and $2_A$ in the linear CCD 17 are cleared, a correlation calculation is performed to obtain the distance to the object to be measured. The reason why the corresponding signals in the cells $1_A$ and $2_A$ in the linear CCD 17 are invalidated is that they need not be added since no charges are shifted to these cells, i.e., since no charges are transferred from the sensor array 11 even when charges are to be added to those in the ring CCD 18. The same applies to the first embodiment.

As described above, reflected light of light emitted by the light projecting portion is sensed, and when the amount of charges to be transferred to the CCD is smaller than the capacity of the skim element, the light projection of the IRED is stopped. Otherwise, an image signal is obtained using the IRED in the same manner as in the first embodiment. The distance to the object is measured on the basis of image data of the object obtained in this manner. For this reason, the distance can be accurately measured irrespective of an offset of the barycentric position of an image caused by the use of the IRED, and distance measurements can be prevented from being disabled due to perspective conflict, thus allowing accurate distance measurements.

When sufficient reflected light cannot be obtained even by projecting light, e.g., when the object is present at a very far position or when light projected by the IRED is not effective since the object has a very low reflectance, since the received light amount is small, signal charges must be circulated several times through the ring CCD to accumulate signals in the method of the first embodiment. For this reason, the offset amount of an image generated upon transferring charges through the cells of the CCD becomes very large, thus disturbing accurate distance measurements. Hence, an output signal is obtained without projecting any light and circulating charges, and the distance is measured based on the obtained output signal. For this reason, any offset of an image upon transferring charges through the CCD can be prevented from being accumulated, and accurate distance measurements are guaranteed.

<Modification of Third Embodiment>

Another embodiment of the present invention will be described below.

Figure 30:
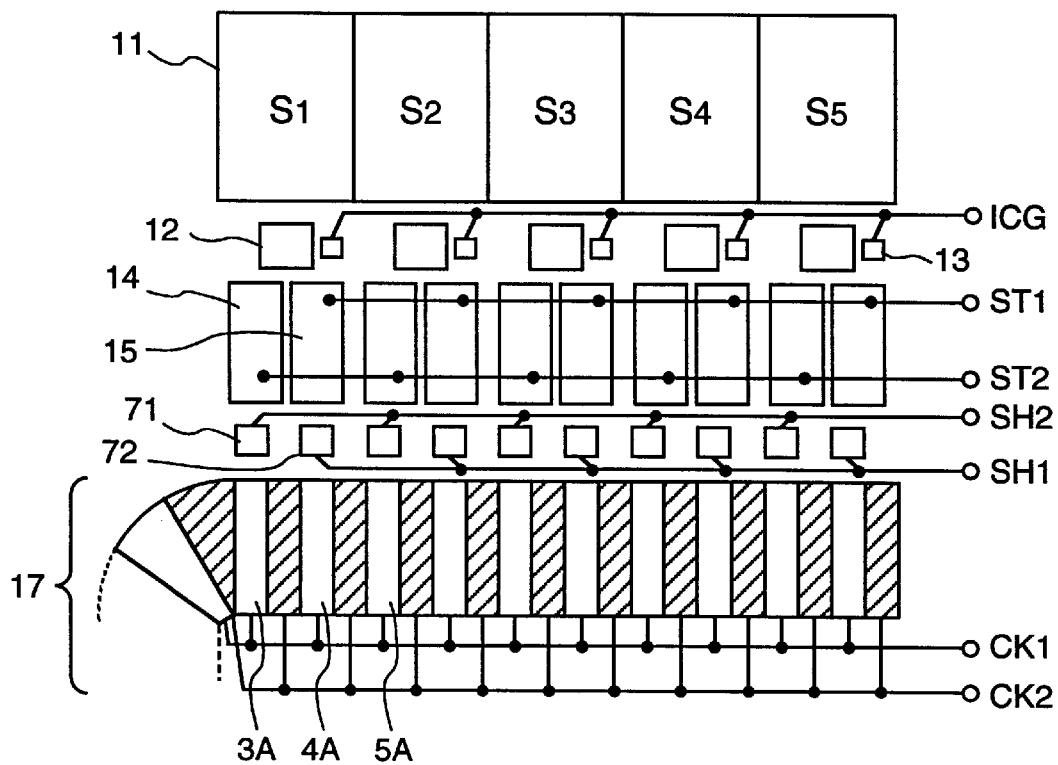
FIG. 30 is a schematic view showing principal part of a distance measuring device according to still another embodiment of the present invention.
Figure 32:
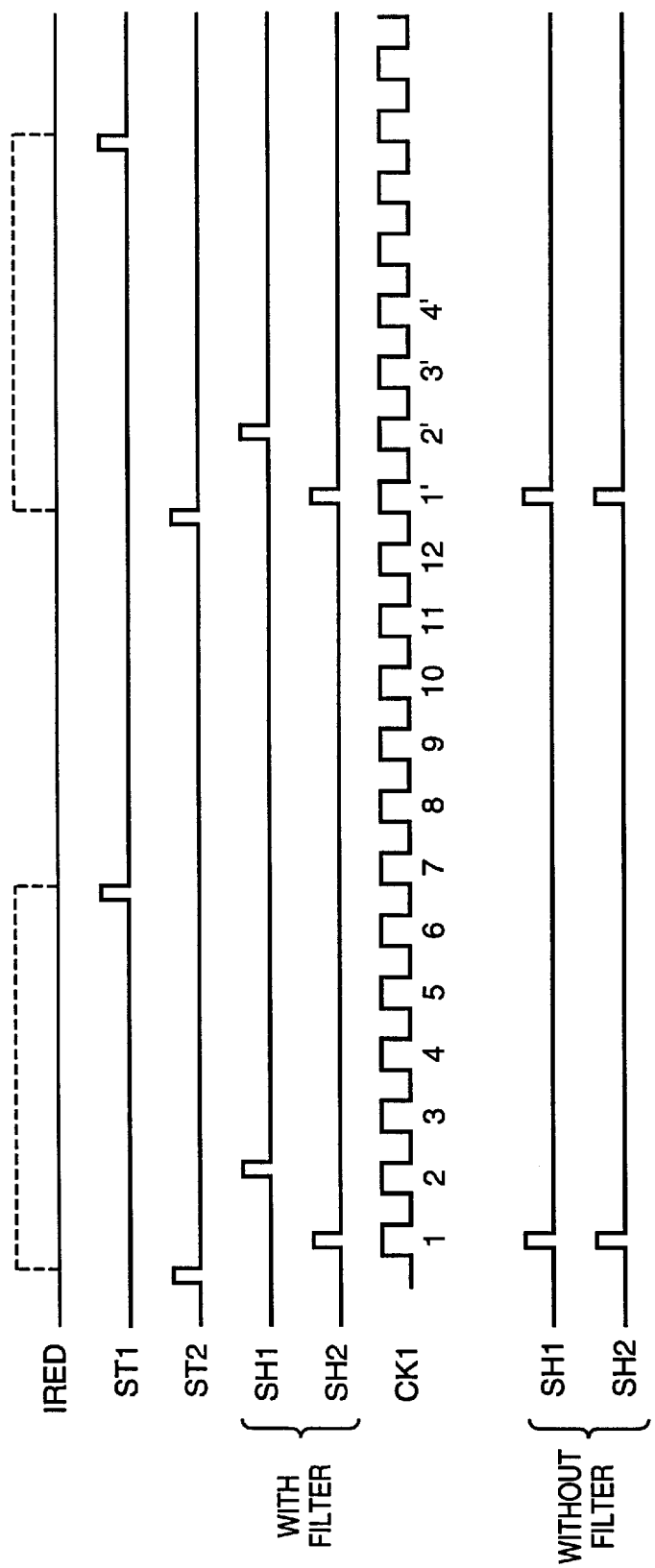
FIG. 32 is a timing chart for explaining the operation timings of the device shown in FIG. 30.

FIG. 30 shows a distance measuring device in which the device structure shown in FIG. 2 is partially modified, and a portion of the ring CCD 18 is not shown. FIG. 32 is a timing chart of this device. Referring to FIG. 30, reference numeral 71 denotes OFF charge shift portions for shifting charges in the second accumulation portions (OFF charge accumulation portions) 14 to the linear CCD 17 in response to a pulse $SH_2$. Reference numeral 72 denotes ON charge shift portions for shifting charges in the first accumulation portions (ON charge accumulation portions) 15 to the linear CCD 17 in response to a pulse $SH_1$.

As can be seen from the timing chart in FIG. 32, in this embodiment, since the light-emitting element 104 that projects a light spot does not emit light at all, a pulse IRED is kept at LOW level. The timing chart in FIG. 32 is different from that shown in FIG. 4 in that the pulse SH is divided into two pulses ($SH_1$ and $SH_2$). When a low-pass filter function is enabled (with a low-pass filter), the pulse $SH_2$ is output at the same timing as the pulse SH in FIG. 4, and the pulse $SH_1$ is output at the timing of the next pulse CK. With this control, signal charges of a pair of adjacent sensor blocks can be added by the linear CCD 17. Therefore, a wrong distance measurement value can be prevented by the low-pass filter function from being obtained. For example, signal charges from the sensor block $S_2$ are stored in the charge accumulation portions 14 and 15. Charges in the accumulation portion 14 are transferred to the cell $5_A$ in response to the pulse $SH_2$. Charges in the cell $5_A$ are transferred to the cell $4_A$ in response to the next clock. At the same time, charges from the sensor block $S_1$ are added to those in the cell $4_A$ in response to the pulse $SH_1$.

Figure 4:
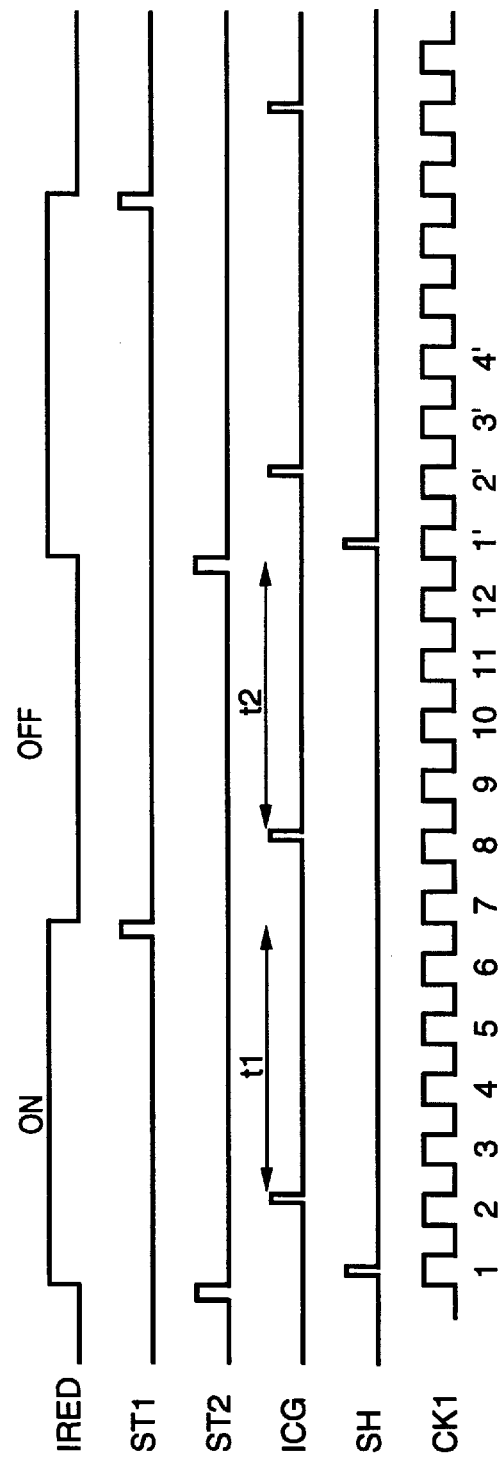
FIG. 4 is a timing chart showing the operation timings of the respective portions when a charge is transferred from each sensor block to a linear CCD in the device shown in FIG. 2.

When the low-pass filter function is disabled (without a low-pass filter), the pulses $SH_1$ and $SH_2$ are generated at the same timings as those of the pulses SH, and the same operation as in FIG. 4 is performed.

Figure 31:
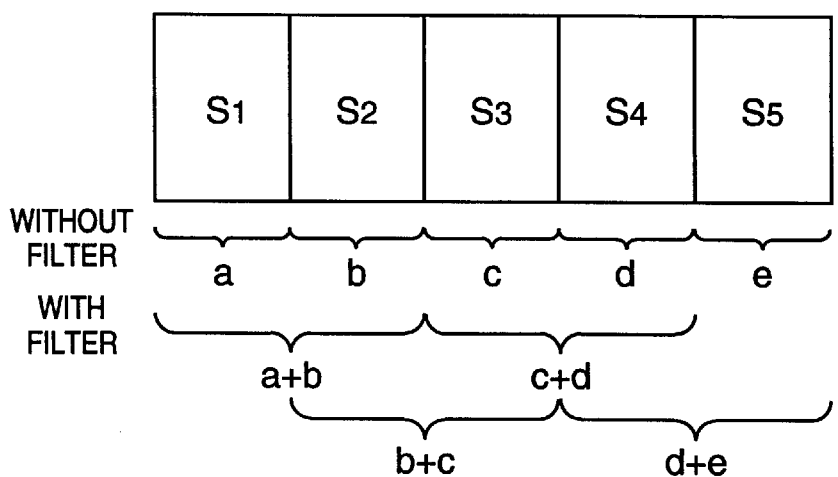
FIG. 31 is a view for explaining the low-pass filter function in FIG. 30.

The effects with and without the low-pass filter will be explained below with reference to FIG. 31. Referring to FIG. 31, in the case without a low-pass filter, outputs a to e from the five sensor blocks $S_1$ to $S_5$ are independently shifted to the linear CCD 17.

In the case with a low-pass filter, signal charges from adjacent ones of the sensor blocks $S_1$ to $S_5$ of the linear CCD 17 are added to each other (a+b, b+c, c+d, and d+e). Using this image signal, the low-pass filter effect as that obtained when the sensor blocks overlap each other is obtained, and an image signal can be prevented from changing even when spatial frequency components higher than the sensor pitch are received. At this time, outputs to which signal charges from adjacent ones of the sensor blocks $S_1$ to $S_5$ are not added may be invalidated in a correlation calculation. With this processing, error-free distance measurements can be assured. Signals transferred to the CCD are processed in the same procedure as in the non-projection distance measurement procedure shown in FIG. 29.

Still another embodiment of the present invention will be described below with reference to FIGS. 33 and 34.

Figure 33:
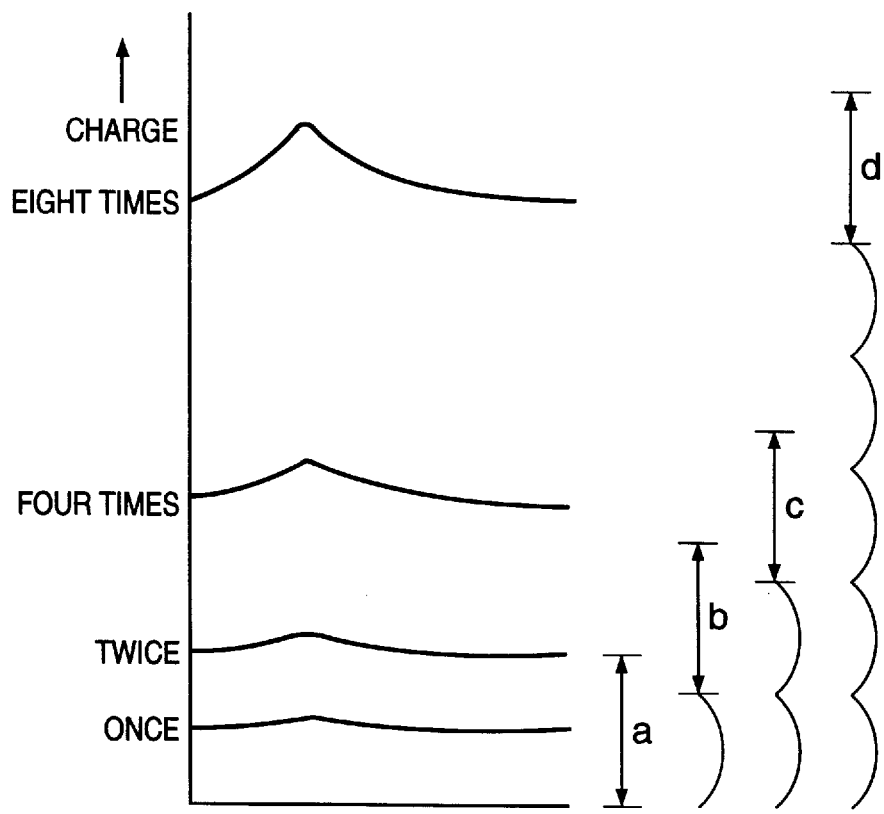
FIG. 33 is a view for explaining the principle of increasing the contrast in a distance measuring device according to still another embodiment of the present invention.

FIG. 33 is a view for explaining the method of amplifying an image signal on the device to emphasize its contrast in the non-projection distance measurement operation using the charge skimming function.

Referring to FIG. 33, curves indicated by "once", "twice", "four times", and "eight times" respectively represent image signals of the accumulated charge amounts added by the ring CCDs 113b and 114b. Although the contrast of the image signal increases when charges are added by the ring CCD in this manner, the dynamic range must also be broadened accordingly. If the actual dynamic range is a range a, only signal charges for one light projection are not saturated, and signal charges added twice or more disturb a distance measurement operation. However, it is almost impossible to perform a distance measurement based on the correlation using a signal with such low contrast.

In this embodiment, charges are evenly skimmed by the skim portions 117 and 118 from image signals that are circulated through the CCDs 113b and 114b. When charges are added twice, a charge amount apparently in a range b can be output without being saturated, and only the range where the contrast of an image signal added twice is generated can be output as an image signal.

Similarly, when the ring CCDs 113b and 114b add charges four times and the charge skimming operation of the skim portions 117 and 118 is performed twice while monitoring the level of the signal output, an image signal output in a range c can be obtained. Likewise, when addition is performed up to eight times, an image signal output in a range d is obtained, and the contrast portion of the image signal is amplified to eight times. As a result, distance measurements based on the correlation can be easily attained.

Figure 34:
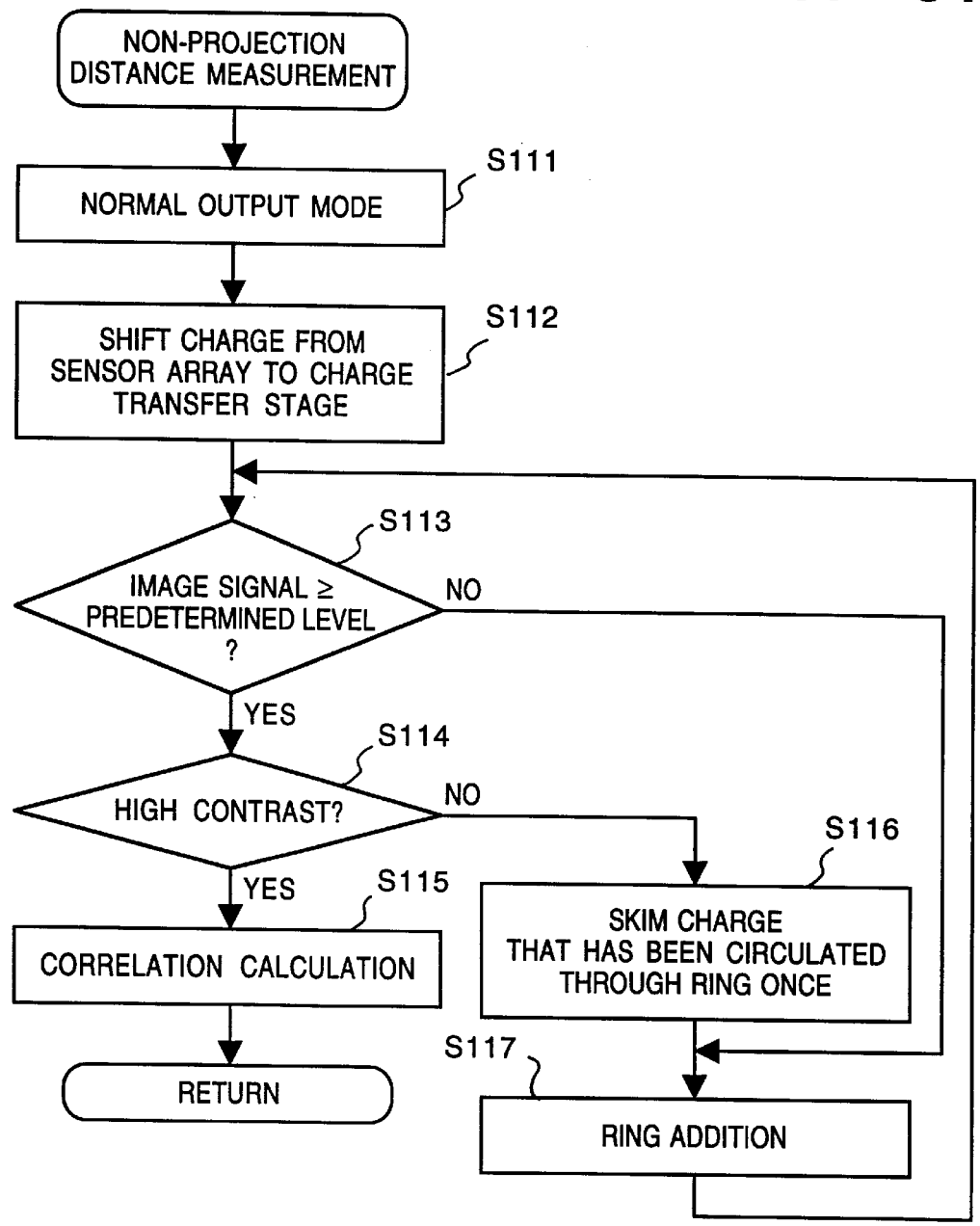
FIG. 34 is a flow chart showing the operation of the device described in FIG. 33.

FIG. 34 is a flow chart showing the non-projection distance measurement operation of the distance measuring device of this embodiment.

In step S111, the output mode of the output signal OS in FIG. 5 is switched to the normal mode. In step S112, charge signals from the sensor arrays 105 and 106 are shifted to the charge transfer unit (ring CCDs 113b and 114b).

In step S113, it is checked by monitoring the outputs from the ring CCDs 113b and 114b if an image signal has a predetermined level or higher. If N in step S113, the flow advances to step S117; otherwise, the flow advances to step S114. Note that the predetermined level indicates a level corresponding to the amount of charges to be skimmed by one skimming operation of the skim portions 117 and 118.

In step S117, charges from the sensor arrays 105 and 106 are shifted again to the charge transfer unit (ring CCDs 113*b* and 114*b*), and the flow advances to step S113.

It is monitored in step S114 if the contrast is high enough to calculate the correlation of the image signals. If Y in step S114, the flow advances to step S115. In step S115, a correlation calculation is performed to obtain a distance measurement value.

If it is determined in step S114 that the contrast is insufficient, the flow advances to step S116, and charges for one round of the ring CCDs 113*b* and 114*b* are unconditionally skimmed by the skim portions 117 and 118. Thereafter, the flow advances to step S117.

By executing the above-mentioned steps, the contrast can be emphasized, and distance measurements based on a correlation can be easily attained. Hence, even when the output from the sensor array has a low contrast, distance measurements can be performed.

As another mode of this embodiment, a light projecting portion may be arranged, and when the amount of charges to be removed by the skim portions 117 and 118 is larger than that from the sensor array, the processing shown in FIG. 34 may be selected and executed; otherwise, the processing shown in FIG. 28 may be executed. With this control, even when the luminance of external light is high, distance measurements can be reliably performed.

As described above, according to the device of the third embodiment, the two different distance measurement methods, i.e., the first processing executed in a state wherein the ON/OFF operation of the projected light spot is performed, and the second processing executed in a state wherein the projection of a light spot is turned off can be executed by a single device. In the second processing, signal charges are circulated through the ring portion while disabling the projection of a light spot and the operation of the skim portions, and the difference between signals from the two sensor arrays is not calculated. For this reason, distance measurements can be performed even for an object at a far distance or an object with a low reflectance from which a signal of the projected light spot is hardly obtained or when the luminance of external light is high.

Even when a distance measurement is performed in the light-projection OFF state, an accurate distance measurement can be performed without using any optical low-pass filter.

Furthermore, when a distance measurement is performed in the light-projection OFF state, even when the received light image has a low contrast, an accurate distance measurement can be performed without requiring any high-precision device or arithmetic processing such as correction.

The present invention is not limited to the above embodiments and various changes and modifications can be made within the spirit and scope of the present invention. Therefore, to apprise the public of the scope of the present invention, the following claims are made.

What is claimed is:

1. A distance measuring device comprising:
   light projecting means for projecting light onto an object to be measured;
   first and second sensor arrays, each comprising an array of a plurality of sensors, said first and second sensor arrays receiving light beams reflected by the object to be measured via first and second optical paths, and photoelectrically converting the light beams;
   signal transfer means, having at least a portion coupled in a ring shape, for transferring signals from the sensors of said first and second sensor arrays; and
   control means for obtaining two difference signals of signals from said first and second sensor arrays in correspondence with ON and OFF periods of said light projecting means, and calculating a distance to the object to be measured on the basis of a relationship between said two difference signals.

2. The device according to claim 1, further comprising skim means for removing a predetermined signal value from the signals transferred by said signal transfer means.

3. The device according to claim 1, wherein said signal transfer means comprises first ring-shaped signal transfer means for sequentially adding signals from said first sensor array, and second ring-shaped signal transfer means for sequentially adding signals from said second sensor array.

4. The device according to claim 3, wherein said first and second ring-shaped signal transfer means have the same rotation direction of signals.

5. The device according to claim 1, wherein said signal transfer means comprises single ring-shaped signal transfer means.

6. The device according to claim 1, wherein said first sensor array is disposed on an identical straight line to said second sensor array, so that a longitudinal direction of said first sensor array agrees with a longitudinal direction of said second sensor array, and said light projecting means is disposed at a position offset from the straight line, and
   received light images of the light reflected by the object to be measured on said first and second sensor arrays include the sensors of said first and second sensor arrays within a predetermined distance measuring range.

7. The device according to claim 6, wherein a plurality of light projecting means equivalent to said light projecting means are disposed at the position offset from the straight line.

8. The device according to claim 1, wherein said light projecting means selectively projects a plurality of light spots within a range received by said first and second sensor arrays.

9. The device according to claim 8, wherein signals on said first and second sensor arrays corresponding to selected ones of the plurality of light spots can be selected.

10. The device according to claim 8, wherein each of optical paths to the first and second sensor arrays has a plurality of optical axes, and the plurality of optical axes are imaged on said first and second sensor arrays to be substantially superposed on each other.

11. The device according to claim 10, wherein light-receiving lenses each having a plurality of optical axes are arranged in front of said first and second sensor arrays, and a length of each of said first and second sensor arrays is determined so that the plurality of the optical axes of each light-receiving lens do not receive an identical field of view.

12. The device according to claim 10, wherein when a plurality of received light images are formed by the plurality of optical axes with respect to one projected spot light, at least one of the plurality of received light images is selected.

13. An optical device having the distance measuring device according to claim 1, further comprising optical means to be driven in accordance with the distance to the object measured by the distance measuring device.

14. An optical device according to claim 13, wherein said optical means adjusts focus in accordance with the distance to the object measured by the distance measuring device.

15. A distance measuring device comprising:
   light projecting means for projecting a light spot onto an object to be measured, a distance to which is to be measured;

first and second sensor arrays, each comprising an array of a plurality of sensors, said first and second sensor arrays receiving light reflected by the object to be measured and photoelectrically converting the received light;

charge transfer means, having a ring portion, at least a portion of which is coupled in a ring shape, for sequentially accumulating charges;

skim means for removing a predetermined amount of charges from the charges transferred by said charge transfer means; and control means for selectively performing first processing in which signal charges from the sensors of said first and second sensor arrays in ON and OFF states of said light projecting means are circulated through the ring portion while operating said skim means, difference signals of signals from said first and second sensor arrays in correspondence with the ON and OFF states of the projected light spot are calculated, and a distance to the object to be measured is obtained on the basis of relative values of positions of the difference signals on said first and second sensor arrays, and second processing in which signal charges from the sensors of said first and second sensor arrays in an OFF state of said light projecting means are circulated through the ring portion without operating said skim means, and a distance to the object to be measured is obtained on the basis of relative Values of positions of signals from said first and second sensor arrays on said first and second sensor arrays.

16. The device according to claim 15, wherein in the first processing, the signal charges are circulated through the ring portion only once.

17. The device according to claim 15, further comprising:

pairs of charge accumulation means, parallelly disposed between the sensors of said first and second sensor arrays and said charge transfer means, for temporarily holding charges transferred from said first and second sensor arrays to said charge transfer means, first charge accumulation means of each of said pairs of charge accumulation means holding charges obtained from said first and second sensor arrays in the ON state of said light projecting means, and second charge accumulation means thereof holding charges obtained from said first and second sensor arrays in the OFF state of said light projection means; and pairs of charge shift means, each pair including ON charge shift means for shifting the charge accumulated in said first charge accumulation means to said charge transfer means, and OFF charge shift means for shifting the charge accumulated in said second charge accumulation means to said charge transfer means, and wherein after charges are shifted from said OFF charge shift means to said charge transfer means, said charge transfer means is advanced by one stage, and charges are shifted from said ON charge shift means to said charge transfer means, so that charges of adjacent sensors of said first and second sensor arrays can be added to each other by said charge transfer means.

18. The device according to claim 17, wherein an output of a stage to which no charges are shifted in said charge transfer means is invalidated.

19. A distance measuring device comprising:

light projecting means for projecting a light spot onto an object to be measured, a distance to which is to be measured;

first and second sensor arrays, each comprising an array of a plurality of sensors, said first and second sensor arrays receiving light reflected by the object to be measured and photoelectrically converting the received light;

charge transfer means, having a ring portion, at least a portion of which is coupled in a ring shape, for sequentially accumulating charges;

skim means for removing a predetermined amount of charges from the charges transferred by said charge transfer means; and control means for selectively performing first processing in which signal charges from the sensors of said first and second sensor arrays in ON and OFF states of said light projecting means are circulated through the ring portion while operating said skim means, difference signals of signals from said first and second sensor arrays in correspondence with the ON and OFF states of the projected light spot are calculated, and a distance to the object to be measured is obtained on the basis of relative values of positions of the difference signals on said first and second sensor arrays, and second processing in which when a contrast of signals from said first and second sensor arrays in an OFF state of said light projecting means is lower than a predetermined value, the ring portion performs charge accumulation by circulating signal charges from the sensors of said first and second sensor arrays through the ring portion while operating said skim means until the contrast becomes higher than the predetermined value, and a distance to the object to be measured is obtained on the basis of relative values of positions of signals from said first and second sensor arrays on said first and second sensor arrays.

20. The device according to claim 19, wherein when the amount of signal charges from said first and second sensor arrays is larger than the predetermined amount to be removed by said skim means, said second processing is selected and executed.

21. A distance measuring device comprising:

first and second sensor arrays, each comprising an array of a plurality of sensors, said first and second sensor arrays receiving light reflected by an object to be measured and photoelectrically converting the received light;

charge transfer means, having a ring portion, at least a portion of which is coupled in a ring shape, for sequentially accumulating charges;

skim means for removing a predetermined amount of charges from the charges transferred by said charge transfer means; and control means for, when a contrast of signals from said first and second sensor arrays is lower than a predetermined value, performing charge accumulation using the ring portion by circulating signal charges from the sensors of said first and second sensor arrays through the ring portion while operating said skim means until the contrast becomes higher than the predetermined value, and obtaining a distance to the object to be measured on the basis of relative values of positions of signals from said first and second sensor arrays on said first and second sensor arrays.

22. A distance measuring device for measuring a distance to an object, comprising:

light projecting means for projecting light onto an object;

light-receiving means for receiving light reflected by the object at two different light-receiving portions, and converting the light received by said light-receiving portions into respective image signals;

signal transfer means for circulating the image signals converted by said light-receiving means in a ring pattern and outputting the circulated signals, wherein the image signals from said light-receiving means are added to signals circulated by said signal transfer means in synchronism with a round of the image signals circulated through said signal transfer means; and distance measuring means for acquiring two difference signals, each of which corresponds to said two light-receiving portions, where each of said two difference signals is a difference between an image signal corresponding to light received by said light-receiving means when said light projecting means projects light and an image signal corresponding to light received by said light-receiving means when said light projecting means does not project light, and where distance information is obtained to the object on the basis of an offset amount between said two difference signals, wherein said distance measuring means acquires the two difference signals from image signals outputted by said signal transfer means.

23. The device according to claim 22, wherein said signal transfer means comprises ring CCDs in correspondence with the two light-receiving portions, and circulates image signals from the two light-receiving portions in the same direction.

24. The device according to claim 22, wherein said signal transfer means comprises a ring CCD common to the two light-receiving portions.

25. The device according to claim 22, further comprising removing means for removing a constant value from values of the image signals while the image signals go around said signal transfer means.

26. The device according to claim 25, further comprising discrimination means for discriminating, in the ON state of said light projecting means, whether or not an image signal larger than the constant value is obtained, and second distance measuring means for, when the image signal larger than the constant value is obtained, measuring the distance to the object using said distance measuring means, and for, when the image signal larger than the constant value is not obtained, acquiring difference signals, corresponding to the two light-receiving portions, between the image signals corresponding to light received by said light-receiving means in the OFF state of said light projecting means, and obtaining the distance to the object on the basis of an offset amount between the difference signals on the light-receiving portions.

* * * * *